(12) United States Patent
Baek et al.

(10) Patent No.: US 10,133,457 B2
(45) Date of Patent: Nov. 20, 2018

(54) TERMINAL FOR DISPLAYING CONTENTS AND OPERATING METHOD THEREOF

(71) Applicant: LG ELECTRONICS INC., Seoul (KR)

(72) Inventors: Bumhyeon Baek, Seoul (KR); Woosung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 412 days.

(21) Appl. No.: 14/546,923

(22) Filed: Nov. 18, 2014

(65) Prior Publication Data

US 2016/0011745 A1 Jan. 14, 2016

(30) Foreign Application Priority Data

Jul. 14, 2014 (KR) ........................ 10-2014-0088337

(51) Int. Cl.
  *G06F 3/0482* (2013.01)
  *G06F 3/0484* (2013.01)
  *G06F 3/0488* (2013.01)

(52) U.S. Cl.
  CPC ........ *G06F 3/04842* (2013.01); *G06F 3/0482* (2013.01); *G06F 3/04883* (2013.01)

(58) Field of Classification Search
  CPC ... G06F 3/0482; G06F 3/04842; G06F 3/0488
  See application file for complete search history.

(56) References Cited

U.S. PATENT DOCUMENTS

| | | | |
|---|---|---|---|
| 7,669,142 B2 * | 2/2010 | Ray | G06F 17/30905 715/254 |
| 8,615,721 B2 | 12/2013 | Hara | |
| 9,223,483 B2 | 12/2015 | Thorsander et al. | |
| 9,600,108 B2 | 3/2017 | Lee et al. | |

(Continued)

FOREIGN PATENT DOCUMENTS

| | | |
|---|---|---|
| CN | 101202977 | 6/2008 |
| CN | 101464882 | 6/2009 |

(Continued)

OTHER PUBLICATIONS

European Patent Office Serial No. 14200590.9, Search Report dated Dec. 8, 2015, 11 pages.

(Continued)

*Primary Examiner* — Andrew L Tank
(74) *Attorney, Agent, or Firm* — Lee, Hong, Degerman, Kang & Waimey

(57) ABSTRACT

Provided is an operating method of a terminal. The method includes: displaying a contents list on a display of the terminal, the contents list including a plurality of items, each of the plurality of items corresponding to a respective one of a plurality of contents; selecting at least two items from among the plurality of items in the displayed contents list in response to receiving of a first input, the selected at least two items displayed distinguishably from the rest of the plurality of items that is not selected in the contents list; and displaying a first content among the plurality of selected contents in response to receiving of a second input, the first content corresponding to a first item among the selected at least two items.

12 Claims, 71 Drawing Sheets

(56) References Cited

U.S. PATENT DOCUMENTS

| | | | | |
|---|---|---|---|---|
| 2005/0251748 | A1* | 11/2005 | Gusmorino | G06F 17/30126 715/713 |
| 2006/0277167 | A1* | 12/2006 | Gross | G06F 17/30905 |
| 2007/0204232 | A1 | 8/2007 | Ray et al. | |
| 2008/0250354 | A1* | 10/2008 | Park | G06F 3/0482 715/845 |
| 2008/0297485 | A1 | 12/2008 | Park | |
| 2009/0164567 | A1* | 6/2009 | Hara | G06F 3/0482 709/203 |
| 2010/0085318 | A1* | 4/2010 | Lee | G06F 3/04883 345/173 |
| 2011/0078630 | A1* | 3/2011 | Duquene | G06F 3/0482 715/823 |
| 2011/0087999 | A1* | 4/2011 | Bichsel | G06F 3/04817 715/845 |
| 2011/0161853 | A1* | 6/2011 | Park | G06F 3/0488 715/769 |
| 2013/0135323 | A1 | 5/2013 | Cheon et al. | |
| 2013/0227483 | A1 | 8/2013 | Thorsander et al. | |
| 2014/0282253 | A1* | 9/2014 | Zeng | G06F 3/04842 715/833 |
| 2014/0331187 | A1* | 11/2014 | Hicks | G06F 3/0488 715/845 |
| 2015/0033102 | A1* | 1/2015 | Losvik | G06F 17/21 715/202 |
| 2015/0046811 | A1* | 2/2015 | Higashi | G06F 3/04842 715/716 |
| 2015/0309698 | A1* | 10/2015 | Senderek | G06F 3/04842 715/815 |

FOREIGN PATENT DOCUMENTS

| | | |
|---|---|---|
| CN | 101714057 | 5/2010 |
| DE | 202012007707 | 9/2012 |
| KR | 1020080089955 | 10/2008 |
| KR | 10-2013-0135644 | 12/2013 |

OTHER PUBLICATIONS

Korean Intellectual Property Office Application Serial No. 10-2014-0088337, Office Action dated May 21, 2015, 4 pages.

Apple Inc., "Working with Images in the Browser (Chapter 5) and Displaying Images in the Viewer (Chapter 6)" Aperture 3 User Manual, XP055370650, 2012, 78 pages.

European Patent Office Application Serial No. 14200590.9, Office Action dated May 16, 2017, 9 pages.

The State Intellectual Property Office of the People's Republic of China Application Serial No. 201410665780.1, Office Action dated Feb. 2, 2018, 12 pages.

MacMostVideo, "Viewing Photos With the Finder (MacMost Now 612)", XP54977822A, 2011, 2 pages.

European Patent Office Application Serial No. 14200590.9, Office Action dated Oct. 30, 2017, 8 pages.

* cited by examiner

Iran Secretly Sending Drones and Supplies
Into Iraq, U.S. Officials Say
By MICHAEL R. GORDON and ERIC SCHMITT
June 25, 2014
BRUSSELS — Iran is directing surveillance
drones over Iraq from an airfield in
Baghdad and is supplying Iraqi forces with
tons of military equipment and other
supplies, according to American officials.

The secret Iranian programs are a rare
instance in which Iran and the United
States share a near-term goal:

Senior American officials emphasized that
the parallel efforts were not coordinated,
and in an appearance at NATO headquarters
here on Wednesday, Secretary of State John
Kerry highlighted some of the potential
risks.

Major Ruling Shields Privacy of Cellphones
Supreme Court Says Phones Can't Be
Searched Without a Warrant —245

The Supreme Court, in its decision on
Wednesday, was keenly alert to the central
role that cellphones play in contemporary
life.
STEPHEN CROWLEY / THE NEW YORK TIMES
By ADAM LIPTAK
JUNE 25, 2014
WASHINGTON – In a sweeping victory for
privacy rights in the digital age, the
Supreme Court on Wednesday unanimously
ruled that the police need warrants to
search the cellphones of people they
arrest.

Iran Secretly Sending Drones and Supplies
Into Iraq, U.S. Officials Say
By MICHAEL R. GORDON and ERIC SCHMITT
June 25, 2014
BRUSSELS - Iran is directing surveillance
drones over Iraq from an airfield in
Baghdad and is supplying Iraqi forces with
tons of military equipment and other
supplies, according to American officials.

The secret Iranian programs are a rare
instance in which Iran and the United
States share a near-term goal:

Senior American officials emphasized that
the parallel efforts were not coordinated,
and in an appearance at NATO headquarters
here on Wednesday, Secretary of State John
Kerry highlighted some of the potential
risks.

Iran Secretly Sending Drones and Supplies Into Iraq, U.S. Officials Say
By MICHAEL R. GORDON and ERIC SCHMITT
June 25, 2014
BRUSSELS — Iran is directing surveillance drones over Iraq from an airfield in Baghdad and is supplying Iraqi forces with tons of military equipment and other supplies, according to American officials.

The secret Iranian programs are a rare instance                   nited States share a           oal"

Senior American o            asized that the parallel efforts we     t coordinated, and in an appearance at NATO headquarters here on Wednesday, Secretary of State John Kerry highlighted some of the potential risks.

Iran Secretly Sending Drones and Supplies
Into Iraq, U.S. Officials Say
By MICHAEL R. GORDON and ERIC SCHMITT
June 25, 2014
BRUSSELS - Iran is directing surveillance
drones over Iraq from an airfield in
Baghdad and is supplying Iraqi forces with
tons of military equipment and other
supplies, according to American officials.

The secret Iranian programs are a rare
instance in which Iran and the United
States share a near-term goal:

Senior American officials emphasized that
the parallel efforts were not coordinated,
and in an appearance at NATO headquarters
here on Wednesday, Secretary of State John
Kerry highlighted some of the potential
risks.

Iran Secretly Sending Drones and Supplies Into Iraq, U.S. Officials Say
By MICHAEL R. GORDON and ERIC SCHMITT
June 25, 2014
BRUSSELS - Iran is directing surveillance drones over Iraq from an airfield in Baghdad and is supplying Iraqi forces with tons of military equipment and other supplies, according to American officials.

The secret Iranian programs are a rare instance in which Iran and the United States share a near-term goal:

Senior American officials emphasized that the parallel efforts were not coordinated, and in an appearance at NATO headquarters here on Wednesday, Secretary of State John Kerry highlighted some of the potential risks.

Iran Secretly Sending Drones and Supplies Into Iraq, U.S. Officials Say
By MICHAEL R. GORDON and ERIC SCHMITT
June 25, 2014
BRUSSELS — Iran is directing surveillance drones over Iraq from an airfield in Baghdad and is supplying Iraqi forces with tons of military equipment and other supplies, according to American officials.

The secret Iranian programs are a rare instance in which Iran and the United States share a near-term goal:

Senior American officials emphasized that the parallel efforts were not coordinated, and in an appearance at NATO headquarters here on Wednesday, Secretary of State John Kerry highlighted some of the potential risks.

┌─────────────────────────────────┐
  │ In a U.S. Court, Iraqis Accuse Blackwater │
  │ of Killings in 2007              │
  │                                  │──215
  │ Sarhan Deab Abdul Moniem leaving court on │
  │ Tuesday after testifying in the Blackwater │
  │ trial.                           │
  │ GABRIELLA DEMCZUK / THE NEW YORK TIMES │
  │ By MATT APUZZO                   │
  │ June 25, 2014                    │
  │ WASHINGTON - The witness wore a suit with │
  │ no tie, the top button of his gray shirt │
  │ undone.                          │
  │                                  │
  │ Sarhan Deab Abdul Moniem, the witness, was │
  │ a traf │░░░░│ that d │░░░░│ ber   │
  │ 2007,  │░░░░│ y of B │░░░░│       │
  │ Worldw │░░░░│ ulled  │░░░░│ ffic  │
  │ circle │░░░░│ and st │░░░░│ ng.   │
  └─────────────────────────────────┘
           237            247
```

FIG.26B

235 — | Iran Secretly Sending Drones and Supplies Into Iraq, U.S. Officials Say
By MICHAEL R. GORDON and ERIC SCHMITT
June 25, 2014
BRUSSELS - Iran is directing surveillance drones over Iraq from an airfield in Baghdad and is supplying Iraqi forces with tons of military equipment and other supplies, according to American officials.

The secret Iranian programs are a rare

151

Major Ruling Shields Privacy of Cellphones Supreme Court Says Phones Can't Be Searched Without a Warrant — 245

The Supreme Court, in its decision on Wednesday, was keenly alert to the central role that cellphones play in contemporary life.
STEPHEN CROWLEY / THE NEW YORK TIMES
By ADAM LIPTAK
JUNE 25, 2014
WASHINGTON - In a sweeping victory for

TERMINAL FOR DISPLAYING CONTENTS AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2014-0088337, filed on Jul. 14, 2014, the contents of which are hereby incorporated by reference herein in its entirety.

BACKGROUND

The present disclosure relates to a terminal and an operating method thereof. In particular, the terminal in the present disclosure allows selection of a plurality of contents, and viewing and managing of the plurality of selected contents.

Terminals may be divided into mobile/portable terminals and stationary terminals according to their portability. Again, the mobile/portable terminals may be divided into handheld terminals and vehicle mount terminals depending on whether a user can carry them directly.

As functions of such terminals become diversified, terminals are implemented in the form of a multimedia player having complex functions, for example, capturing pictures or videos, playing music or video files, playing games, and receiving broadcasts.

Moreover, a user of a terminal uses various contents stored in the terminal and contents accessed or transmitted via the Internet. However, when accessing contents using a terminal, since contents need to be selected from a predetermined page, in order to access a plurality of contents, a user needs to return to the predetermined page after accessing one content to access or select other contents on another page. For example, in order for a user to view various news articles on a portal site's main page, after selecting and viewing one news article, the user needs to return to the main page to view another news article.

Therefore, a terminal and an operating method thereof for allowing a user of the terminal to select a plurality of contents at a time and to use the selected contents are needed.

SUMMARY

Embodiments provide a terminal and an operating method thereof allowing a user to select a plurality of contents and easily view the plurality of selected contents.

Embodiments also provide a terminal and an operating method thereof allowing a user to transmit and manage information on a plurality of selected contents.

In one embodiment, provided is an operating method of a terminal. The method includes: displaying a contents list on a display of the terminal, the contents list including a plurality of items, each of the plurality of items corresponding to a respective one of a plurality of contents; selecting at least two items from among the plurality of items in the displayed contents list in response to receiving of a first input, the selected at least two items displayed distinguishably from the rest of the plurality of items that is not selected in the contents list; and displaying a first content among the plurality of selected contents in response to receiving of a second input, the first content corresponding to a first item among the selected at least two items.

In another embodiment, a terminal includes: a display configured to display a contents list, the contents list including a plurality of items, each of the plurality of items corresponding to a respective one of a plurality of contents; and a controller configured to: select at least two items from among the plurality of items in response to receiving of a first input, the first input received via the displayed contents list; cause the display to display the selected at least two items distinguishably from the rest of the plurality of items that is not selected in the contents list; and cause the display to display a first content among the plurality of selected contents in response to receiving of a second input, the second input received via a first item among the selected at least two items, and the first item corresponding to the first content.

The details of one or more embodiments are set forth in the accompanying drawings and the description below. Other features will be apparent from the description and drawings, and from the claims.

BRIEF DESCRIPTION OF THE DRAWINGS

FIGS. 12A, 12B, 13A, 13B, 14A, and 14B are views illustrating switching of displayed content according to an embodiment of the present invention.

FIGS. 16A to 16C and 17A to 17C are views illustrating content switched according to a selected order according to an embodiment of the present invention.

FIGS. 22A, 22B, 23A, and 23B are views illustrating a selected content display according to an embodiment of the present invention.

FIGS. 24A and 24B are views illustrating content selection cancellation according to an embodiment of the present invention.

FIGS. 26A, 26B, 27A, and 27B are views illustrating display of a plurality of contents according to an embodiment of the present invention.

DETAILED DESCRIPTION OF THE EMBODIMENTS

Hereinafter, a terminal relating to the present invention will be described in more detail with reference to the accompanying drawings. The suffixes "module" and "unit" for components used in the description below are assigned or mixed in consideration of easiness in writing the specification and, do not have distinctive meanings or roles by themselves.

A mobile terminal described in this specification may include smartphones, laptop computers, digital broadcasting terminals, personal digital assistants (PDAs), portable multimedia players (PMPs), and navigators. However, except that a configuration according to embodiments listed in this specification is applicable to only a mobile terminal, it is apparent to those skilled in the art that the configuration is applicable to a stationary terminal such as a digital TV and a desktop computer.

Then, a structure of a mobile terminal according to an embodiment of the present invention is described with reference to FIG. 1.

Figure 1:
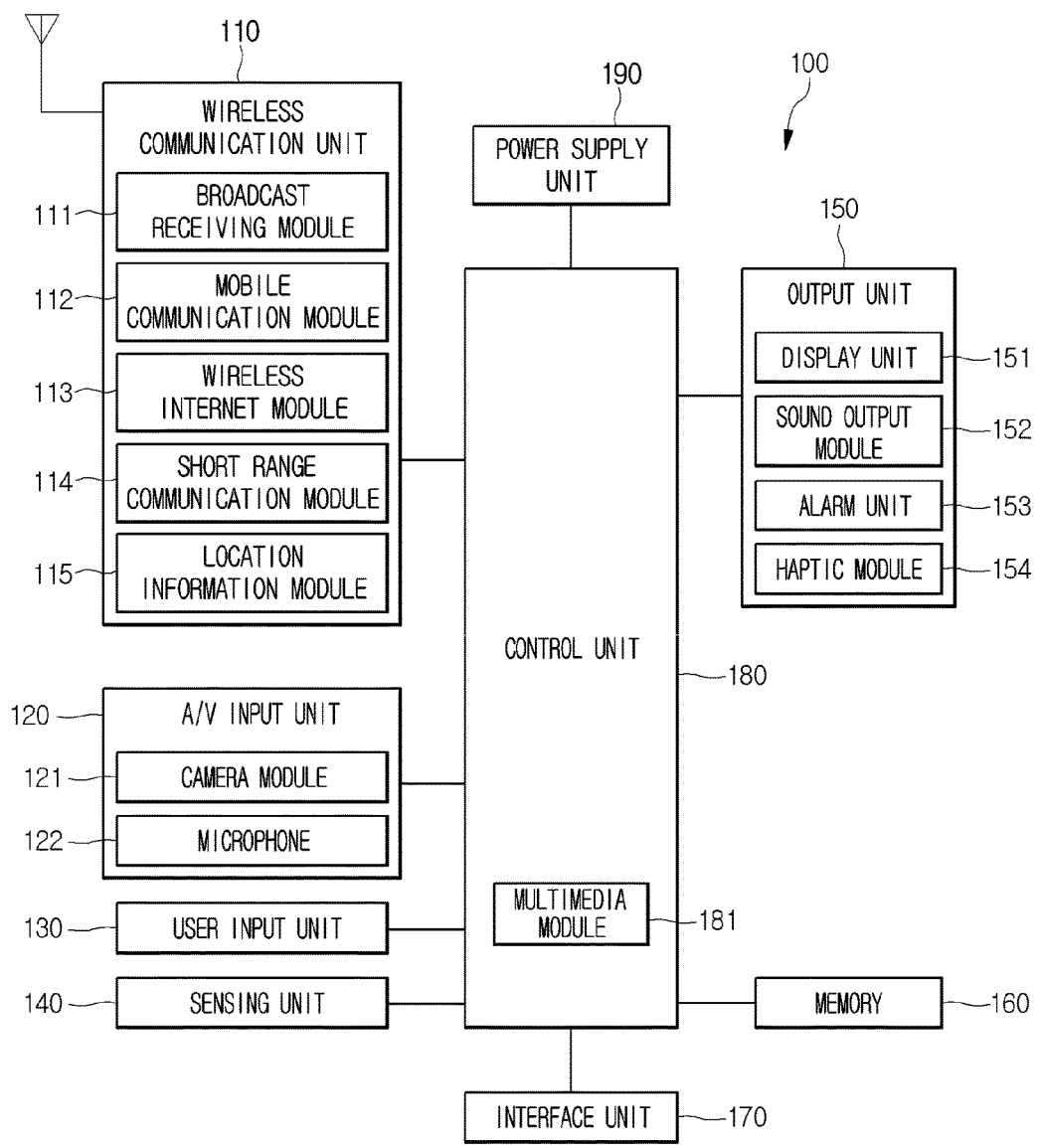
FIG. 1 is a block diagram of a terminal according to an embodiment of the present invention.

FIG. 1 is a block diagram of a mobile terminal according to an embodiment of the present invention.

The mobile terminal 100 includes a wireless communication unit 110, an audio/video (A/V) input unit 120, a user input unit 130, a sensing unit 140, an output unit 150, a memory 160, an interface unit 170, a control unit 180, and a power supply unit 190. Since some of the components shown in FIG. 1 may not be essential, a mobile terminal having more or less components than those may be implemented.

Hereinafter, the components are described one by one.

The wireless communication unit 110 may include at least one module allowing wireless communication between the mobile terminal 100 and a wireless communication system or between the mobile terminal 100 and a network including the same. For example, the wireless communication unit 110 includes a broadcast receiving module 111, a mobile communication module 112, a wireless Internet module 113, a short range communication module 114, and a location information module 115.

The broadcast receiving module 111 receives broadcast signal and/or broadcast related information from an external broadcast management server through a broadcast channel.

The broadcast channel may include a satellite channel and a terrestrial channel. The broadcast management server may mean a server generating and transmitting broadcast signal and/or broadcast related information or a server receiving pre-generated broadcast signal and/or broadcast related information and transmitting it to a terminal. The broadcast signal may include a TV broadcast signal, a radio broadcast signal, a data broadcast signal and may further include a TV broadcast signal in the form in which a TV broadcast signal or a radio broadcast signal is combined with a data broadcast signal.

The broadcast related information may mean information relating to a broadcast channel, a broadcast program, or a broadcast service provider. The broadcast related information may be provided via a mobile communication network. In such a case, the broadcast related information may be received by the mobile communication module 112.

The broadcast related information may exist in various formats. For example, the broadcast related information may be in formats, for example, Electronic Program Guide (EPG) of Digital Multimedia Broadcasting (DMB), or Electronic Service Guide (ESG) of Digital Video Broadcast-Handheld (DVB-H).

The broadcast reception module 111 may receive digital broadcast signals by using a digital broadcast system, for example, Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). Of course, the broadcast receiving module 111 may be configured to be fit for another broadcasting system in addition to the above-mentioned digital broadcasting system.

Broadcast signal and/or broadcast related information received through the broadcast receiving module 111 may be stored in the memory 160.

The mobile communication module 112 may transmit/receive wireless signal to/from at least one of a base station, an external terminal, and a server on a mobile communication network. The wireless signal may include various formats of data according to a voice call signal, a video call signal, or text/multimedia messaging.

The wireless Internet module 113 refers to a module for wireless Internet access and may be equipped internally or externally with respect to the mobile terminal 100. A wireless Internet technique may include Wireless LAN (WLAN) (for example, Wi-Fi), Wireless broadband (Wibro), World Interoperability for Microwave Access (Wimax), and High Speed Downlink Packet Access (HSDPA).

The short range communication module 114 refers to a module for short range communication. A short range communication technique may include Bluetooth™' Radio Frequency Identification (RFID), infrared Data Association (IrDA), Ultra Wideband (UWB), and ZigBee™.

The location information module 115 is a module for obtaining the location of a mobile terminal and its representative example includes a global position system (GPS) module.

The A/V input unit 120 is for inputting audio signal or video signal and may include a camera module 121 and a microphone 122. The camera module 121 processes a video frame of a still image or a video obtained by an image sensor in a video call mode or a capturing mode. The processed video frame may be displayed on the display unit 151.

The video frame processed in the camera module 121 may be stored in the memory 160 or transmitted to the outside via the wireless communication unit 110. The camera module 121 may be provided in more than two according to a usage environment.

The microphone 122 receives an external sound signal by a microphone in a call mode, a recording mode, or a voice recognition mode and processes it as electrical voice data. In the case of a call mode, the processed voice data may be converted into a format transmittable to a mobile communication base station and then outputted through the mobile communication module 112. Various noise reduction algorithms for reducing noise occurring during a process for receiving external voice signal may be implemented in the microphone 122.

The user input unit 130 generates input data in order for a user to control an operation of a mobile terminal 100. The user input unit 130 may be configured with a keypad, a dome switch, a touch pad (for example, a resistive/capacitive touch pad), a jog wheel, and a jog switch.

The sensing unit 140 generates a sensing signal for controlling an operation of the mobile terminal 100 by detecting the current state of the mobile terminal 100, for example, an open/close state of the mobile terminal 100, the location of the mobile terminal 100, whether a user contacts the mobile terminal 100, the orientation of the mobile terminal 100, and the acceleration/deceleration of the mobile terminal 100. For example, when the mobile terminal 100 is a slide phone, it is possible to sense whether the slide phone is opened/closed. Additionally, it is possible to sense whether the power supply unit 190 supplies power and whether the interface unit 170 is connected to an external device. Moreover, the sensing unit 140 may include a proximity sensor.

The output unit 150 generates an output relating to visual, auditory, and tactile senses and may include a display unit 151, a sound output module 152, an alarm unit 153, and a haptic module 154.

The display unit 151 displays (outputs) information processed in the mobile terminal 100. For example, when the mobile terminal 100 is in a call mode, it displays a call related user interface (UI) or graphic user interface (GUI). When the mobile terminal 100 is in a video call mode or a capturing mode, the display unit 151 displays a captured or/and received image, a UI, or a GUI.

The display unit 151 may include at least one of a liquid crystal display (LCD), a thin film transistor-liquid crystal display (a TFT LCD), an organic light-emitting diode (OLED), a flexible display, and a 3D display.

Some displays among them may be configured with a transparent or optical transmissive type to see the outside therethrough. This may be called a transparent display and its representative example includes Transparent OLED (TOLED). The display unit 151 may be configured with a rear structure or optical transmissive structure. By such a structure, a user may see an object disposed at the rear of a mobile terminal body through an area that the display unit 151 of the mobile terminal body occupies.

According to an implementation form of the mobile terminal 100, the display unit 151 may be provided in more than two. For example, in the mobile terminal 100, a plurality of display units may be disposed at one side separately or integrally, and may be disposed at different sides.

When a sensor (hereinafter referred to as a touch sensor) for sensing a touch operation of the display unit 151 forms a cross-layer structure (hereinafter referred to as a touch screen), the display unit 151 may be used as an input device in addition to an output device. The touch sensor may have a form of a touch film, a touch sheet, and a touch pad, for example.

The touch sensor may be configured to convert a change in pressure applied to a specific portion of the display unit 151 or capacitance occurring at a specific portion of the display unit 151. The touch sensor may be configured to detect a pressure and a capacitance when touched in addition to a touched position and area.

When there is a touch input on the touch sensor, signals corresponding thereto are transmitted to a touch controller. The touch controller processes the signals and then transmits the next corresponding data to the control unit 180. Therefore, the control unit 180 may identify which area of the display unit 151 is touched.

Additionally, the control unit 180 may determine the type of a user's touch input on the basis of an area, a pressure, and a capacitance when touched. Accordingly, the control unit 180 may identify a user's finger touch, nail touch, finger joint touch, and multi touch using a plurality of fingers.

Referring to FIG. 1, the proximity sensor may be disposed in an inner area of the mobile terminal 100 surrounded by the touch screen or near the touch screen. The proximity sensor refers to a sensor for detecting whether an object approaches a predetermined detection surface or there is an object near a predetermined detection surface by using the force of electromagnetic field or infrared ray. The proximity sensor has a longer life cycle and a higher availability than a contact type sensor.

The proximity sensor includes a transmissive type photoelectric sensor, a direct reflective type photoelectric sensor, a mirror reflective type photoelectric sensor, a high frequency oscillation type proximity sensor, a capacitive proximity sensor, a magnetic proximity sensor, and infrared proximity sensor. When the touch screen is a capacitive type, it is configured to detect the proximity of a pointer by using a change in electric field according to the proximity of the pointer. In this case, the touch screen (or the touch sensor) described above may be classified as a proximity sensor.

Hereinafter, for convenience of description, an action for recognizing the pointer as on the touch screen while the pointer is close without contacting the touch screen is referred to as proximity touch and an action for actually contacting the touch screen with the pointer is referred to as contact touch. A position where the pointer is proximity-touched on the touch screen means a position that the pointer corresponds vertically when the pointer is proximity-touched.

The proximity sensor detects a proximity touch and a proximity touch pattern (for example, a proximity touch distance, a proximity touch direction, a proximity touch speed, a proximity touch time, a proximity touch position, and a proximity touch movement state). Information corresponding to the detected proximity touch operation and proximity touch pattern may be outputted on a touch screen.

The sound output module 152 may output audio data received from the wireless communication unit 110 or stored in the memory 160 in a call signal reception mode, a call mode, a recording mode, or a voice recognition mode. The sound output module 152 may output a sound signal relating to a function (for example, a call signal reception sound and a message reception sound) performed in the mobile terminal 100. The sound output module 152 may include a receiver, a speaker, and a buzzer.

The alarm unit 153 outputs a signal for notifying an event occurrence of the mobile terminal 100. An example of an event occurring in the mobile terminal 100 includes call signal reception, message reception, key signal input, and touch input. The alarm unit 153 may output a signal for notifying event occurrence in another form other than a video signal or an audio signal, for example, vibration. The video signal or the audio signal may be outputted through the display unit 151 or the sound output module 152 and the display unit 151 and the sound output module 152 may be classified as part of the alarm unit 153.

The haptic module 154 generates various haptic effects that a user can feel. A representative example of a haptic effect that the haptic module 154 generates includes vibration. The intensity and pattern that the haptic module 154 generates are controllable. For example, different vibrations may be synthesized and outputted or may be outputted sequentially.

The haptic module 154 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 154 may be implemented to deliver a haptic effect through a direct contact and also allow a user to feel a haptic effect through a muscle sense such as a finger or an arm. The haptic module 154 may be more than two according to a configuration aspect of the mobile terminal 100.

The memory 160 may store a program for an operation of the control unit 180 and may temporarily store input/output data (for example, a phone book, a message, a still image, and a video). The memory 160 may store data on various patterns of vibrations and sounds outputted during a touch input on the touch screen.

The memory 160 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The mobile terminal 100 may operate in relation to a web storage performing a storage function of the memory 160 on Internet.

The interface unit 170 may serve as a path to all external devices connected to the mobile terminal 100. The interface unit 170 may receive data from an external device, receive power and deliver it to each component in the mobile terminal 100, or transmit data in the mobile terminal 100 to an external device. For example, the interface unit 170 may include a wired/wireless headset port, an external charger port, a wired/wireless data port, a memory card port, a port connecting a device equipped with an identification module, an audio I/O port, a video I/O port, and an earphone port.

Moreover, the identification module, such as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through a port.

Additionally, when the mobile terminal 100 is connected to an external cradle, the interface unit 160 may become a path through which power of the cradle is supplied to the mobile terminal 100 or a path through which various command signals inputted from the cradle are delivered to the mobile terminal 100 by a user. The various command signals or the power inputted from the cradle may operate as a signal for recognizing that the mobile terminal is accurately mounted on the cradle.

The control unit 180 controls overall operations of the mobile terminal 100 in general. For example, the control unit 180 performs a control and processing relating to a voice call, data communication, and a video call. The control unit 180 may include a multimedia module 181 for playing multimedia. The multimedia module 181 may be implemented in the control unit 180 or may be implemented separated from the control unit 180.

The control unit 180 may perform pattern recognition processing so as to recognize handwriting input or drawing input on the touch screen as a text and an image, respectively.

The power supply unit 190 may receive external power or internal power under a control of the control unit 180 and may then supply power necessary for an operation of each component.

For example, various embodiments described herein may be implemented in a computer or device similar thereto readable medium by using software, hardware, or a combination thereof.

According to hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units performing other functions. In some cases, such embodiments may be implemented by the control unit 180.

According to software implementation, embodiments for procedures or functions may be implemented with a separate software module performing at least one function or operation. Software code may be implemented by a software application written in appropriate programming language. The software code may be stored in the memory 160 and may be executed by the control unit 180.

An exemplary operating method of a terminal according to an embodiment of the present invention is described with reference to FIGS. 2 to 42B.

Figure 2:
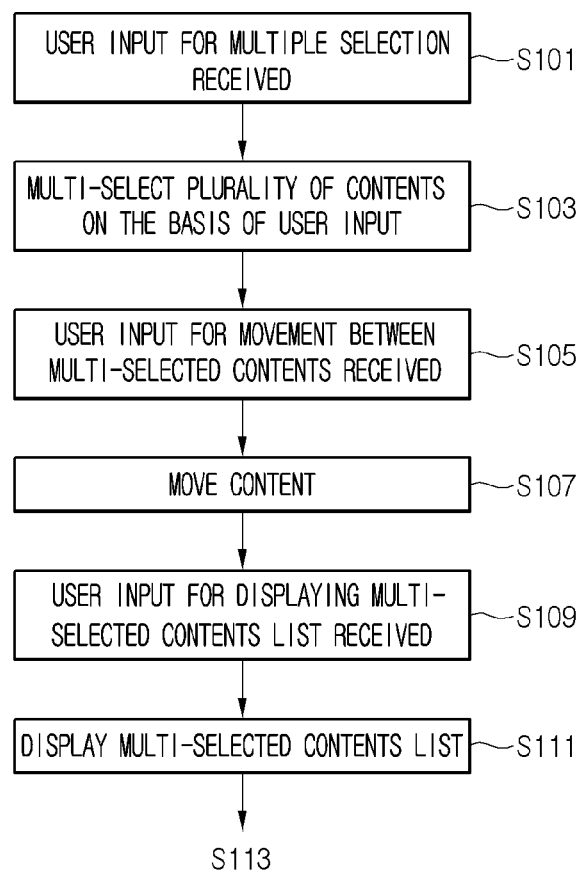
FIGS. 2 to 3 are flowcharts illustrating an operating method of a terminal according to an embodiment of the present invention.
Figure 3:
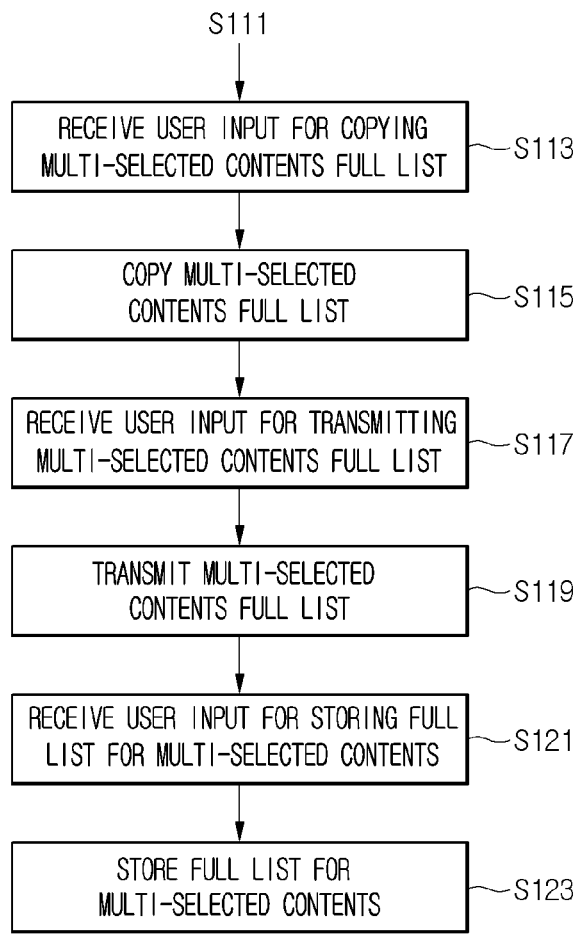

FIGS. 2 to 3 are flowcharts illustrating an operating method of a terminal according to an embodiment of the present invention.

Referring to FIG. 2, the control unit 180 recognizes a user input for multiple selection in operation S101 and multi-selects a plurality of contents in response to the user input in operation S103.

The control unit 180 may receive a signal generated in response to a user's touch input for multi-selecting a plurality of contents from displayed contents list from the touch sensor associated with a touchscreen of the display unit 151. Additionally or alternatively, the control unit 180 may receive a signal generated in response to a user input for multiple selection received via the user input unit 130 such as a keypad or a jog wheel.

According to an embodiment of the present invention, the control unit 180 may recognize a user input, such as touching content by one of a finger touch, a nail touch, a finger joint touch, or a multi touch, as a user input for multiple selection.

Herein, the content may include content displayed on a webpage in addition to documents, images, and sounds stored in the memory 160 of the terminal 100 or stored externally or remotely.

Then, when a contents list for selecting content is not displayed, the control unit 180 may cause the display unit 151 to display the contents list. Accordingly, an operation of the control unit 180 to display the contents list on the display unit 151 may be configured to be separate or may be included in operation S101. Then, the contents list may be displayed in a plurality of pages so that a contents list may be displayed in each of a plurality of pages.

A user input for multiple selection is described with reference to FIGS. 4 to 7C. FIGS. 4 to 7C are views illustrating a user input for multiple selection according to an embodiment of the present invention.

Figure 4:
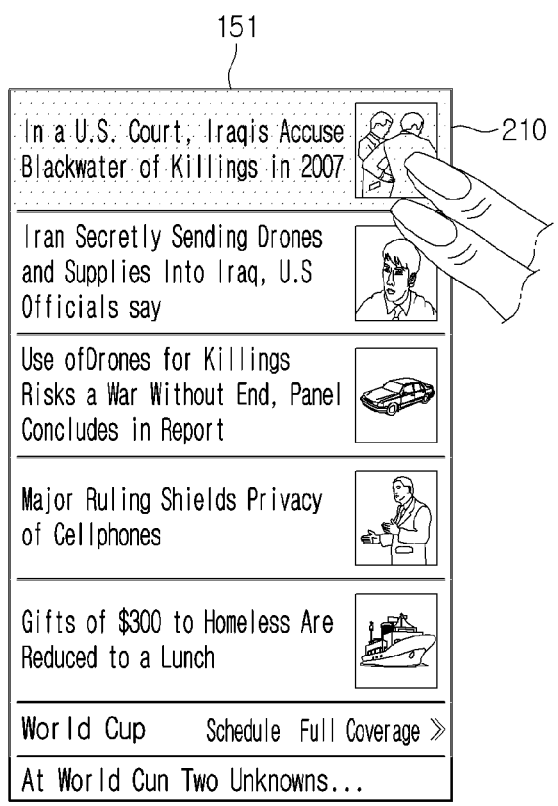
FIGS. 4 to 6 and 7A to 7C are views illustrating a user input for multiple selection according to an embodiment of the present invention.

According to an embodiment of the present invention, referring to FIG. 4, the control unit 180 may recognize a multi touch for selecting content by two fingers from a webpage displayed on the display unit 151 as a user input for multiple selection. Accordingly, the control unit 180 may recognize that the selected content 210 is one of multi-selected contents. Herein, as an example for describing a multi touch using two fingers, the number of fingers of a multi touch for multiple selection may be set diversely according to a user's or designer's selection.

Figure 5:

According to another embodiment of the present invention, referring to FIG. 5, the control unit 180 may recognize a nail touch for selecting content from a webpage displayed on the display unit 151 as a user input for multiple selection. Accordingly, the control unit 180 may recognize that the selected content 210 is one of multi-selected contents.

Figure 6:
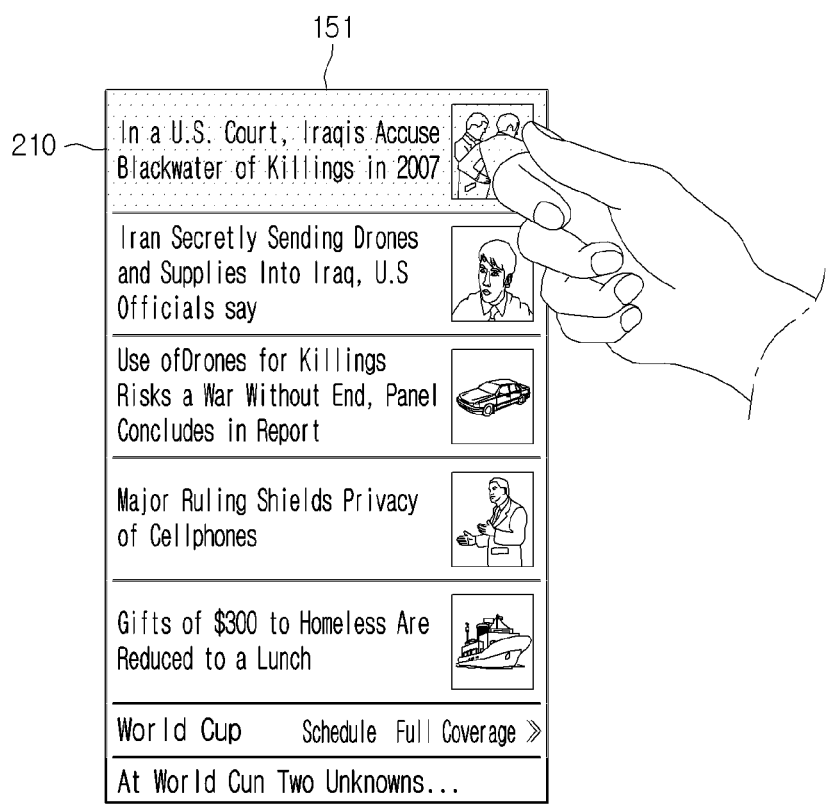

According to another embodiment of the present invention, referring to FIG. 6, the control unit 180 may recognize a finger joint touch for selecting content from a webpage displayed on the display unit 151 as a user input for multiple selection. Accordingly, the control unit 180 may recognize that the selected content 210 is one of multi-selected contents.

Figure 7A:
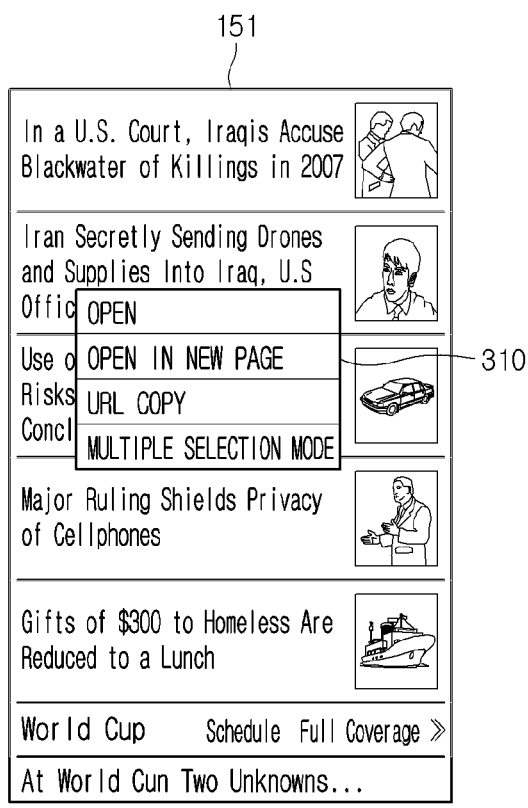
Figure 7B:
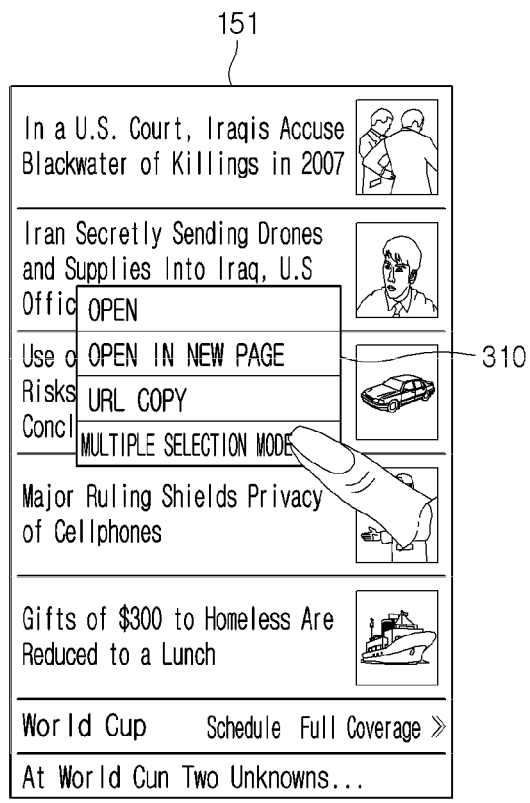
Figure 7C:
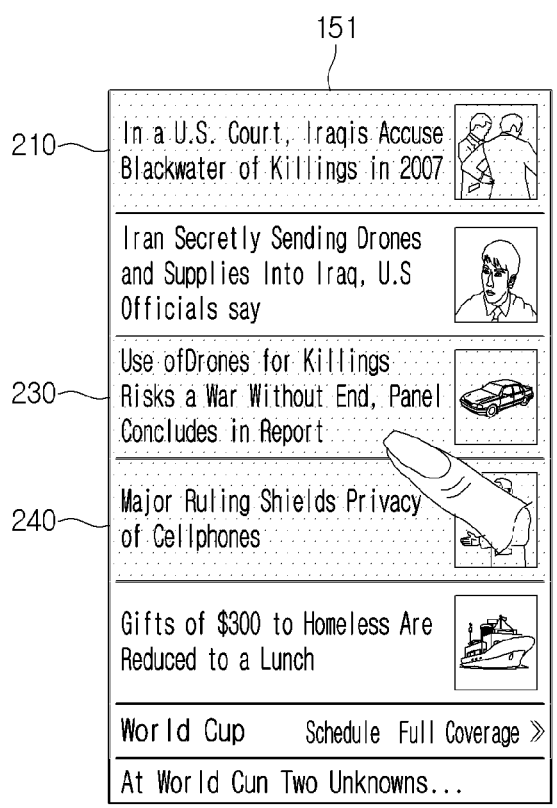

Additionally, the control unit 180 may receive a user input for multiple selection through a multiple selection mode according to a menu selection. This will be described with reference to FIGS. 7A to 7C. FIGS. 7A to 7C are views illustrating a multiple selection mode according to an embodiment of the present invention.

Referring to FIG. 7A, the control unit 180 may cause the display unit 151 to display a pop-up menu 310 for content. Then, as shown in FIG. 7B, the control unit 180 may recognize a user input for selecting a "multiple selection mode" entry from the displayed pop-up menu 310. Herein, the multiple selection mode may mean a mode for multiple selection. The control unit 180 may enter the multiple selection mode on the basis of a user input for multiple selection mode entry. As shown in FIG. 7C, the control unit 180 may recognize a user input for selecting a plurality of contents in the multiple selection mode. For example, the control unit 180 may recognize a plurality of contents 210, 230, and 240 as multi-selected contents on the basis of the user input. Further, the multi-selected contents 210, 230, and 240 may be displayed distinguishably over unselected contents.

Figure 8A:
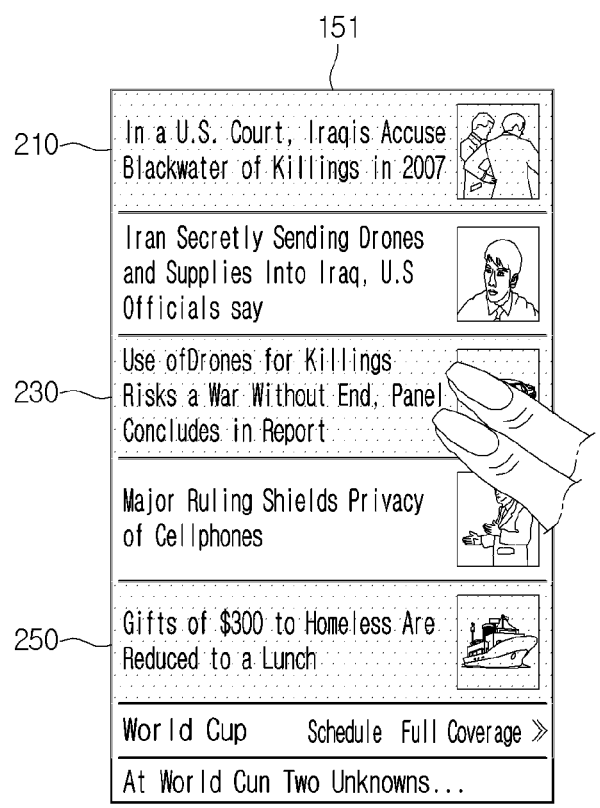
FIGS. 8A and 8B are views illustrating a selection cancellation of multi-selected contents according to an embodiment of the present invention.
Figure 8B:
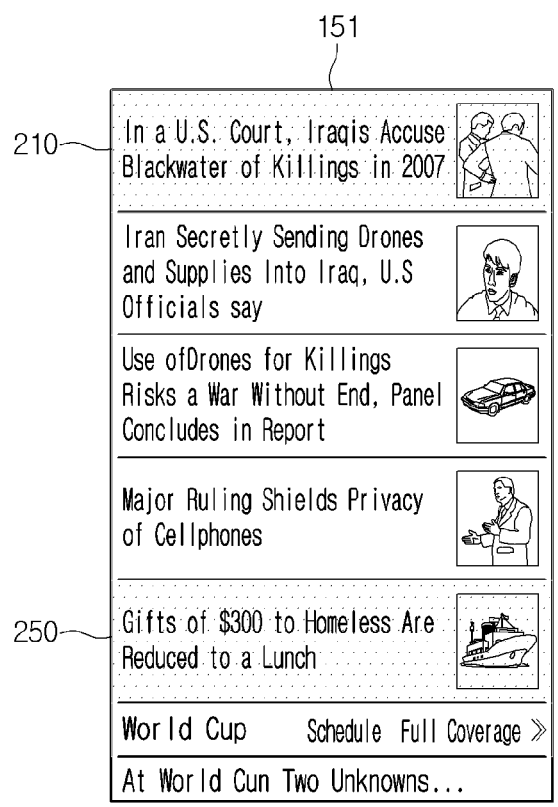

Additionally, the control unit 180 may recognize a user input for unselecting at least one of the multi-selected contents. This will be described with reference to FIGS. 8A to 8B. FIGS. 8A to 8B are views illustrating selection cancellation of multi-selected contents according to an embodiment of the present invention.

Referring to FIG. 8A, the control unit 180 may recognize a user input for selecting one content 230 from among the multi-selected contents 210, 230, and 250. As shown in FIG. 8B, the control unit 180 may exclude the selected content 230 from the multi-selected contents 210, 230, and 250 on the basis of the user input. Herein, a user input for excluding a selected content from multi-selected contents may use a method identical to or different from a method of a user input for multiple selection.

The above description for a user input for multiple selection may vary according to a user's or designer's selection.

FIG. 2 will be referred again.

The control unit 180 recognizes a user input for moving between multi-selected contents in operation S105 and moves to a selected content on the basis of the received user input in operation S107.

Figure 9:
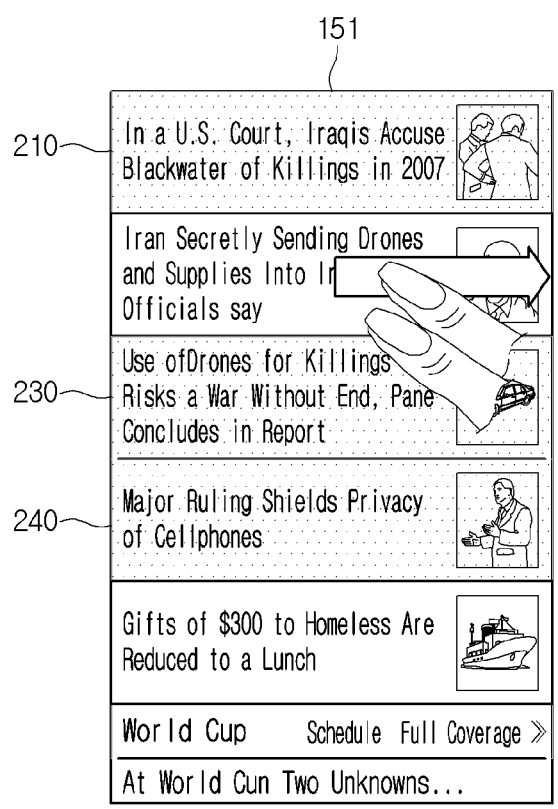
FIGS. 9 to 11 are views illustrating an entry to multi-selected contents according to an embodiment of the present invention.
Figure 10:
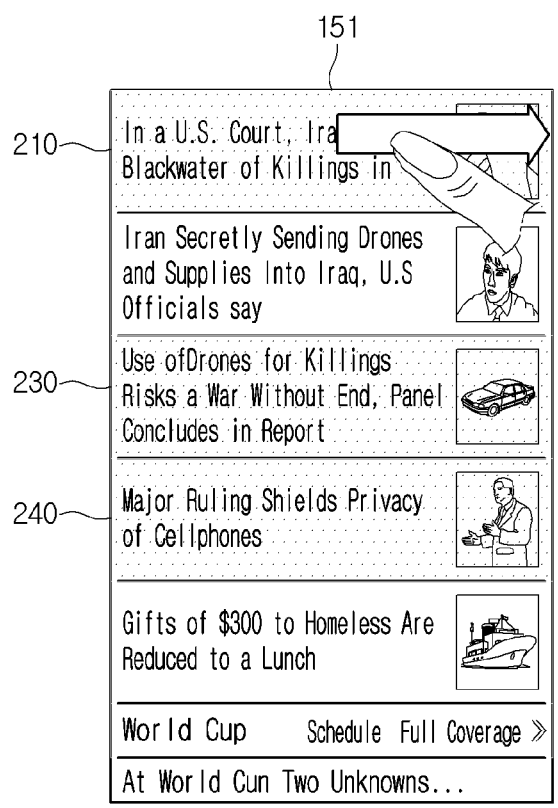
Figure 11:
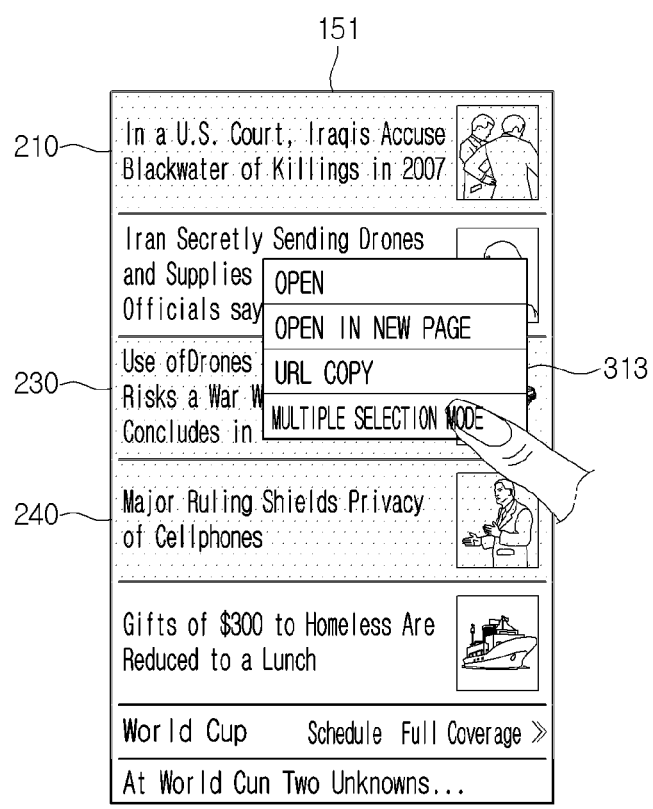

The control unit 180 may recognize a user input for entering one content among the multi-selected contents. Herein, a user input for entering one content among the multi-selected contents may be a swipe touch generated by at least one finger. Then, when entering one content among the multi-selected contents, the control unit 180 may cause the display unit 151 to display the entered content. This will be described with reference to FIGS. 9 to 11. FIGS. 9 to 11 are views illustrating an entry to multi-selected contents according to an embodiment of the present invention.

According to an embodiment of the present invention, referring to FIG. 9, the control unit 180 may recognize a touch input for swiping, for example in the right direction, by two fingers as a user input for entering one content among multi-selected contents. Accordingly, when receiving a touch input for swiping in the right direction by two fingers, the control unit 180 may enter one content among multi-selected contents 210, 230, and 240. Then, the control unit 180 may cause the display unit 151 to display contents 215, 235, and 245 corresponding to the multi-selected contents 210, 230, and 240.

According to another embodiment of the present invention, referring to FIG. 10, the control unit 180 may recognize a touch input for swiping in the right direction by one finger in an area of the multi-selected contents 210, 230, and 240 as a user input for entering one content among multi-selected contents. Accordingly, when receiving a touch input for swiping in the right direction by one finger in the area of the multi-selected contents 210, 230, and 240, the control unit 180 may enter one content among the multi-selected contents 210, 230, and 240. Accordingly, the control unit 180 may cause the display unit 151 to display contents 215, 235, and 245 corresponding to the multi-selected contents 210, 230, and 240.

According to another embodiment of the present invention, referring to FIG. 11, the control unit 180 may recognize a user input for selecting a multi-selected contents entry from a pop-up menu 313 for multi-selected contents. Accordingly, when receiving a touch input for selecting a multi-selected contents entry, the control unit 180 may enter one content among the multi-selected contents 210, 230, and 240. Accordingly, the control unit 180 may cause the display unit 151 to display contents 215, 235, and 245 corresponding to the multi-selected contents 210, 230, and 240.

Moreover, the control unit 180 may switch a content displayed on the display unit 151 to another content included in multi-selected contents.

Moreover, the control unit 180 may receive a user input for switching a content displayed on the display unit 151 to another content included in multi-selected contents. Herein, a user input for switching into one content among the multi-selected contents may be a swipe touch using at least one finger. Then, when switching into one content among multi-selected contents, the control unit 180 may cause the display unit 151 to display the switched content.

For example, the control unit 180 may recognize a touch input for swiping in the right direction by two fingers as a user input for switching into the next content among multi-selected contents. The control unit 180 may recognize a touch input for swiping in the left direction by two fingers as a user input for switching a current content into a previous content among the multi-selected contents.

This will be described with reference to FIGS. 12A to 14B. FIGS. 12A to 14B are views illustrating switching of a displayed content according to an embodiment of the present invention.

Figure 12A:
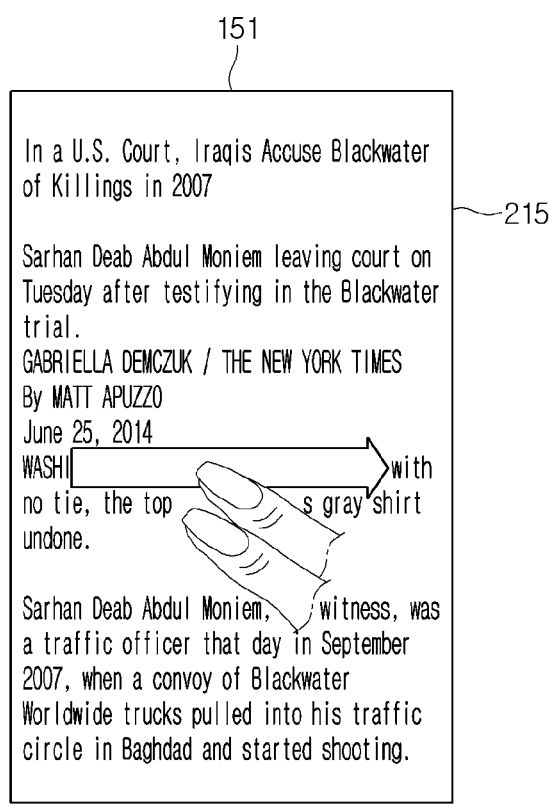

According to an embodiment of the present invention, referring to FIG. 12A, the control unit 180 may recognize a touch input for swiping in the right direction by two fingers while content 215 is displayed as a user input for switching one content into another content among multi-selected contents. Accordingly, when receiving a touch input for swiping in the right direction by two fingers, the control unit 180 may switch one content into another content 230 among the multi-selected contents 210, 230, and 240. As shown in FIG. 12B, the control unit 180 may cause the display unit 151 to display content 235 corresponding to the switched content 230.

Figure 13A:
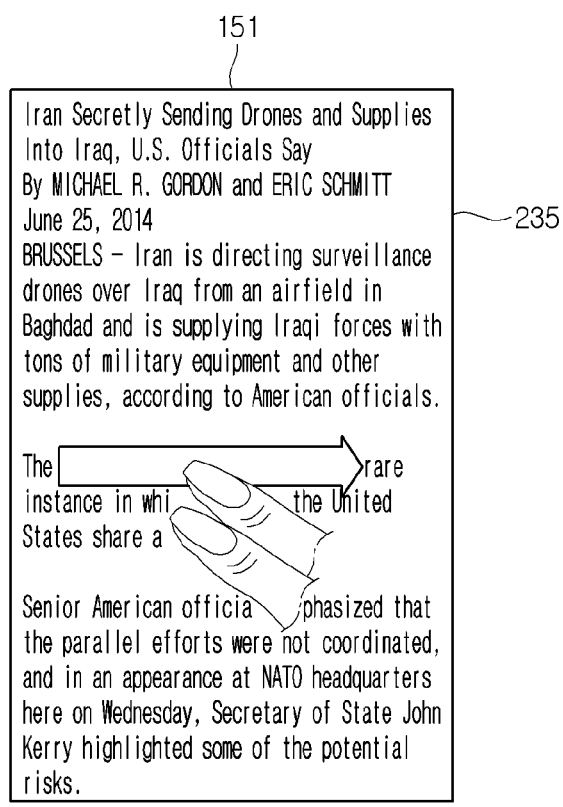

Then, referring to FIG. 13A, when receiving a touch input for swiping in the right direction by two fingers while the switched content 235 is displayed, the control unit 180 may switch the content 235 into another content 240 among the multi-selected contents 210, 230, and 240. Accordingly, as shown in FIG. 13B, the control unit 180 may cause the display unit 151 to display content 245 corresponding to the switched content 240.

Figure 14A:
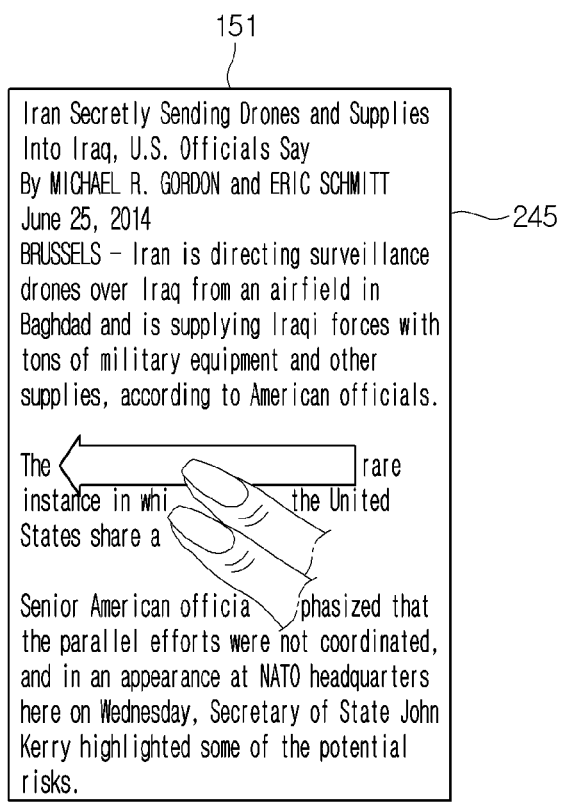

Then, referring to FIG. 14A, when receiving a touch input for swiping in the left direction by two fingers while the switched content 245 is displayed, the control unit 180 may switch the content 245 into the previously displayed content 230 among the multi-selected contents 210, 230, and 240. Accordingly, as shown in FIG. 14B, the control unit 180 may cause the display unit 151 to display the switched content 235.

In such a way, the control unit 180 may perform switching between multi-selected contents according to a user input for content switching. Then, the control unit 180 may cause displaying of the switched content on the display unit 151.

The above description for contents switching may vary according to a user's or designer's selection. Additionally, the control unit 180 may switch contents according to the order of multi-selected contents. This will be described with reference to FIGS. 15 to 17C.

Figure 15:
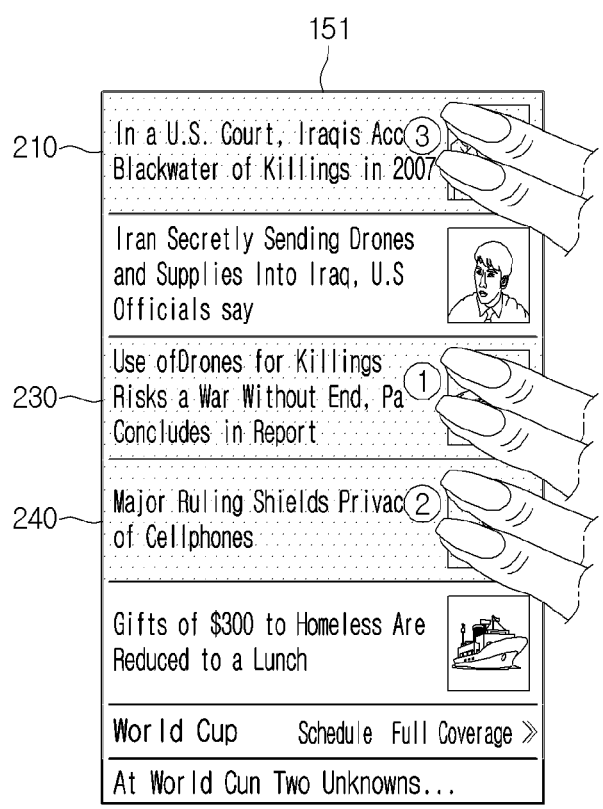
FIG. 15 is a view illustrating the order of a user input for multiple selection according to an embodiment of the present invention.

FIG. 15 is a view illustrating the order of a user input for multiple selection according to an embodiment of the present invention. FIGS. 16 to 17C are views illustrating a content switched according to a selected order according to an embodiment of the present invention.

Referring to FIG. 15, the control unit 180 may recognize a user input for selecting a plurality of contents. Then, the control unit 180 may recognize the input order of the multi-selected contents. Accordingly, the control unit 180 may recognize the selection order of a first selected content 230, a second selected content 240, and a third selected content 210 among the multi-selected contents. The control unit 180 may enter one content among the multi-selected contents on the basis of the recognized selection order. Accordingly, when receiving a user input for entering one content among the multi-selected contents 210, 230, and 240, the control unit 180 may enter the first selected content 230. Then, the control unit 180 may cause the display unit to display a content 235 corresponding to the first selected contents 230.

Figure 16B:
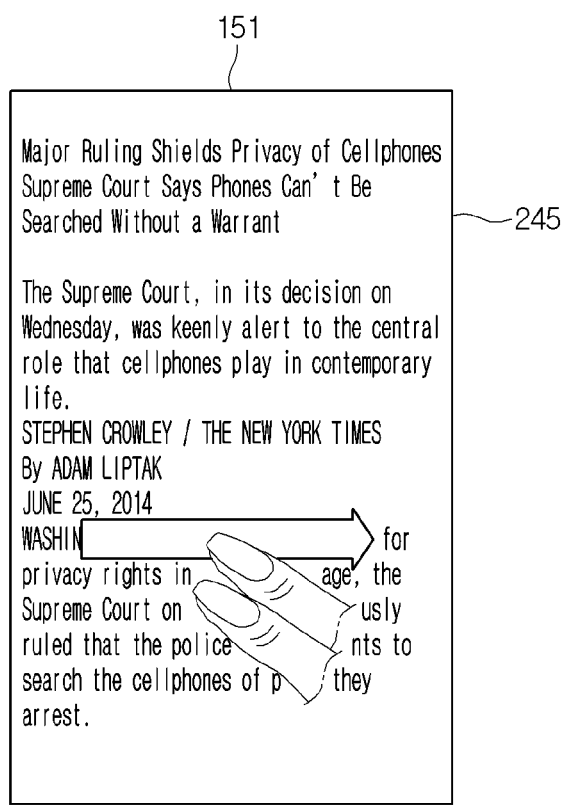
Figure 16C:
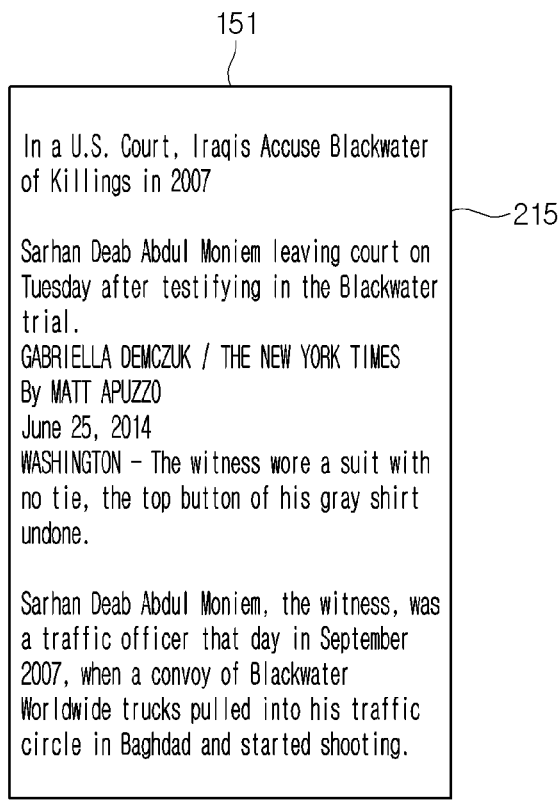

Referring to FIG. 16A, the control unit 180 may recognize a touch input for swiping in the right direction by two fingers while the entered content 235 is displayed as a user input for switching the content 235 into another content among the multi-selected contents 210, 230, and 240. Accordingly, when receiving a touch input for swiping in the right direction by two fingers, the control unit 180 may switch the content 235 into content 245 corresponding to the second selected content 240 among the multi-selected contents 210, 230, and 240. Accordingly, the control unit 180 may cause the display unit 151 to display the switched content 245. Then, as shown in FIG. 16B, the control unit 180 may recognize a touch input for swiping in the right direction by two fingers while the content 245 is displayed as a user input for switching the content 245 into another content among the multi-selected contents 210, 230, and 240. Accordingly, when receiving a touch input for swiping in the right direction by two fingers, the control unit 180 may switch the content 245 into a content 215 corresponding to the third selected content 210 among the multi-selected contents 210, 230, and 240. Accordingly, as shown in FIG. 16C, the control unit 180 may cause displaying of the switched content 215 on the display unit 151.

Figure 17A:
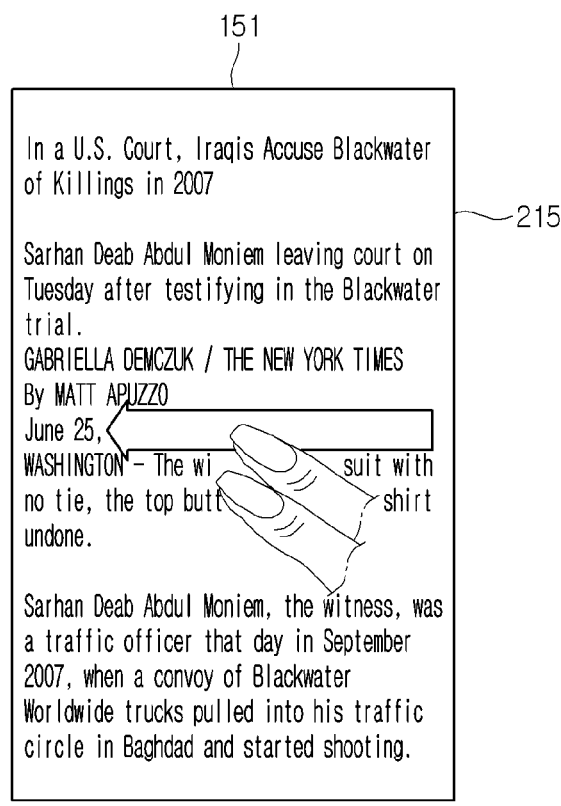
Figure 17B:
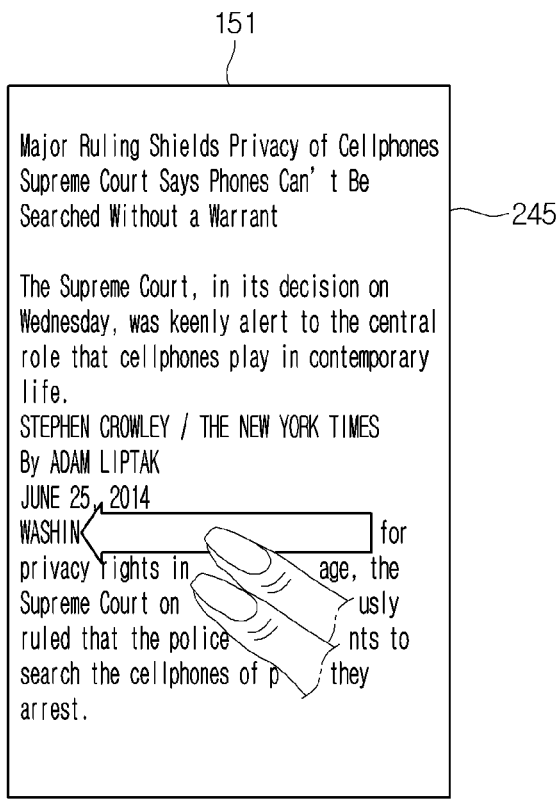

Referring to FIG. 17A, the control unit 180 may recognize a touch input for swiping in the left direction by two fingers while the content 215 is displayed as a user input for switching the content 215 into the previous content among the multi-selected contents 210, 230, and 240. Accordingly, when receiving a touch input for swiping in the left direction by two fingers, the control unit 180 may switch the content 215 into the second selected content 240, i.e., the previous content. Accordingly, the control unit 180 may cause displaying of the switched content 245 on the display unit 151. Then, as shown in FIG. 17B, the control unit 180 may recognize a touch input for swiping in the right direction by two fingers while the content 245 is displayed as a user input for switching the content 245 into the previous content among the multi-selected contents 210, 230, and 240. Accordingly, when receiving a touch input for swiping in the left direction by two fingers, the control unit 180 may switch the content 245 into a content 235 corresponding to the first selected content 230 among the multi-selected contents 210, 230, and 240. Accordingly, as shown in FIG. 17C, the control unit 180 may cause displaying of the switched content 235 on the display unit 151.

In such a way, the control unit 180 may perform switching between multi-selected contents according to a selected order. Then, the control unit 180 may cause displaying of the switched content on the display unit 151.

Then, the above description for contents switching on the basis of the selected order may vary according to a user's or designer's selection. FIG. 2 will be referred again.

When receiving a user input for displaying a multi-selected contents list in operation S109, the control unit 180 causes the display unit 151 to display the multi-selected contents list in operation S111.

The control unit 180 may recognize a user input for displaying the multi-selected contents list. Herein, a user input for displaying a multi-selected contents list may be one of a finger touch, a nail touch, a finger joint touch, and a multi touch. Then, when receiving a user input for displaying a multi-selected contents list, the control unit 180 may cause the display unit 151 to display the multi-selected contents list.

Herein, the multi-selected contents list may include at least one of a thumbnail image for each of multi-selected contents and content for each of multi-selected contents. This will be described with reference to FIGS. 18A to 19B. FIGS. 18A to 19B are views illustrating a multi-selected contents list according to an embodiment of the present invention.

Figure 18A:
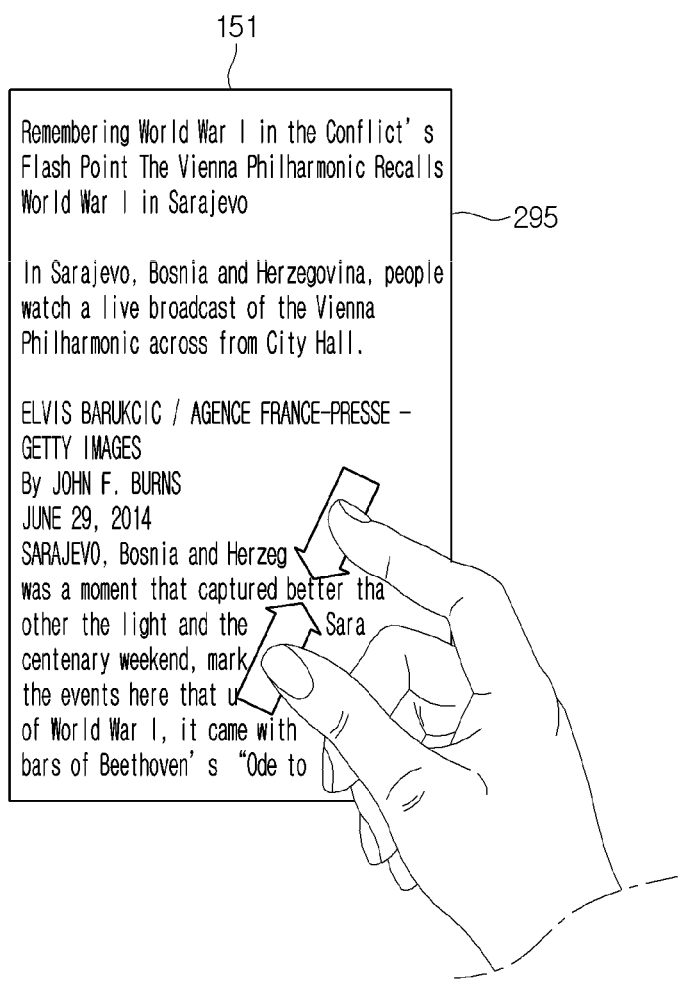
FIGS. 18A, 18B, 19A, and 19B are views illustrating a multi-selected contents list according to an embodiment of the present invention.
Figure 18B:
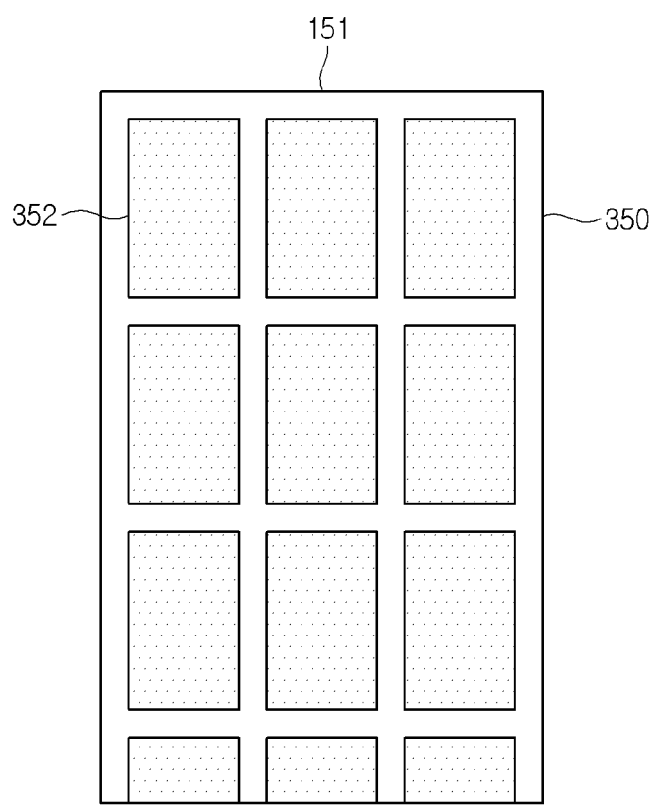

According to an embodiment of the present invention, referring to FIG. 18A, the control unit 180 may recognize a pinching for gathering two fingers at the same time on a screen where one content 295 among multi-selected contents is displayed as a user input for displaying the multi-selected contents list. Accordingly, as shown in FIG. 18B, when receiving the pinching on the screen, the control unit 180 may cause the display unit 151 to display the multi-selected contents list 350. The multi-selected contents list 350 may include a thumbnail image 352 for each of the multi-selected contents. Then, when receiving a user input for selecting one content from the displayed multi-selected contents list, the control unit 180 may cause displaying of the selected content on the display unit 151.

Figure 19A:
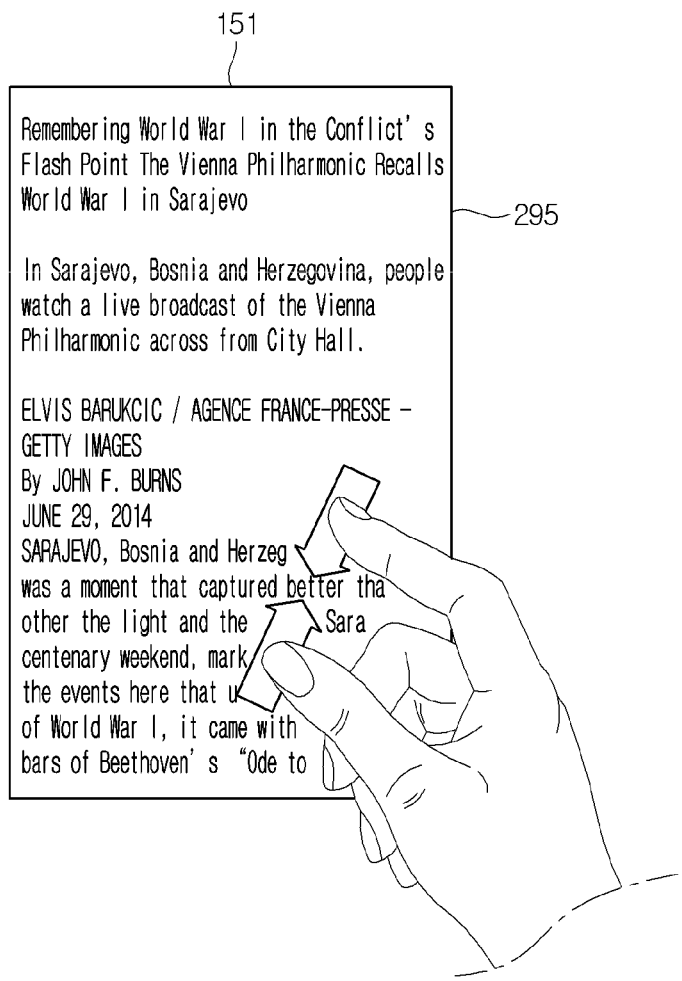
Figure 19B:
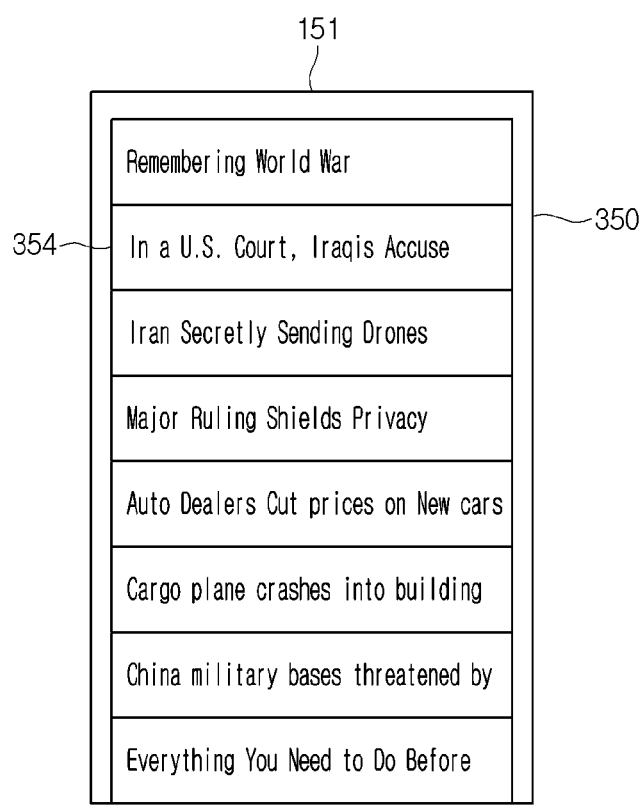

According to another embodiment of the present invention, referring to FIG. 19A, the control unit 180 may recognize a pinching for gathering two fingers at the same time on a screen where one content 295 among multi-selected contents is displayed as a user input for displaying the multi-selected contents list. Accordingly, as shown in FIG. 19B, when receiving the pinching, the control unit 180 may cause the display unit 151 to display the multi-selected contents list 350. The multi-selected contents list 350 may include a content 354 for each of the multi-selected contents. Herein, the content 354 for each of the multi-selected contents may include at least one of the title, summary, source, and link of the content 354. Then, when receiving a user input for selecting one content from the displayed multi-selected contents list, the control unit 180 may cause displaying of the selected content on the display unit 151.

Additionally, the control unit 180 may cause the display unit 151 to display a multi-selected contents list as a thumbnail image for each of multi-selected contents on a portion of a screen where one content among the multi-selected contents is displayed. For example, when receiving a touch for swiping by two fingers from one side of a screen where one content among multi-selected contents is displayed as a user input, the control unit 180 may cause the display unit 151 to display a multi-selected contents list as a thumbnail image for each of the multi-selected contents on a portion of a screen. This will be described with reference to FIGS. 20A to 21B. FIGS. 20A to 21B are views illustrating a thumbnail for each of multi-selected contents according to an embodiment of the present invention.

Figure 20A:
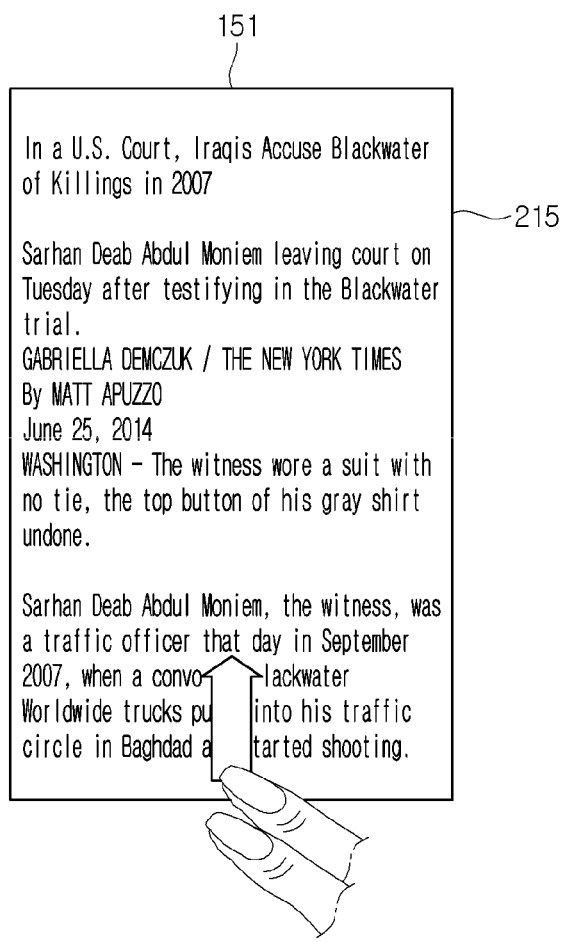
FIGS. 20A, 20B, 21A, and 21B are views illustrating a thumbnail for each of multi-selected contents according to an embodiment of the present invention.
Figure 20B:
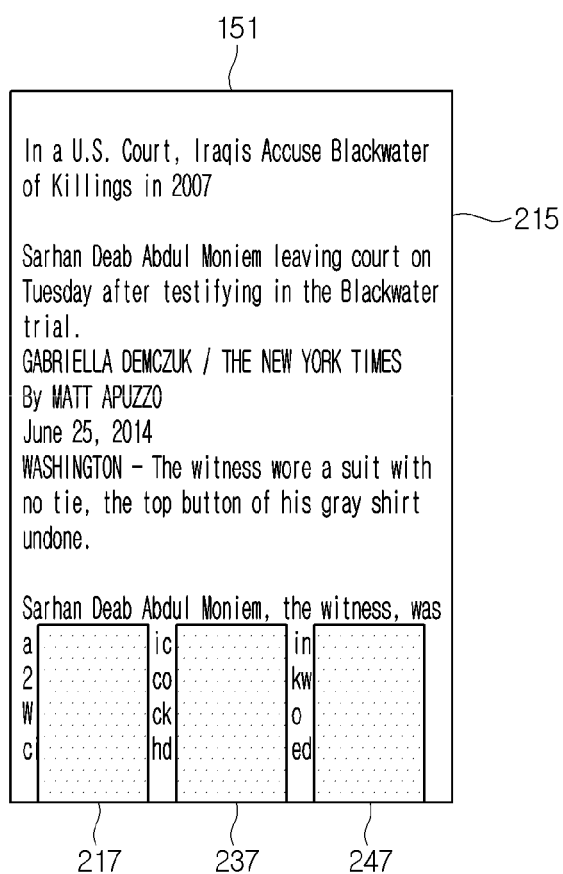

Referring to FIG. 20A, the control unit 180 may recognize a touch input, for example, swiping in the upward direction by two fingers from the lower end of a screen where content 215 corresponding to one content 210 among the multi-selected contents 210, 230, and 240 is displayed, as a user input for displaying a multi-selected contents list. Accordingly, as shown in FIG. 20B, in response to the touch input, the control unit 180 may cause the display unit 151 to display thumbnail images 217, 237, and 247 respectively corresponding to the multi-selected contents 210, 230, and 240, at the lower end of the screen.

Figure 21A:
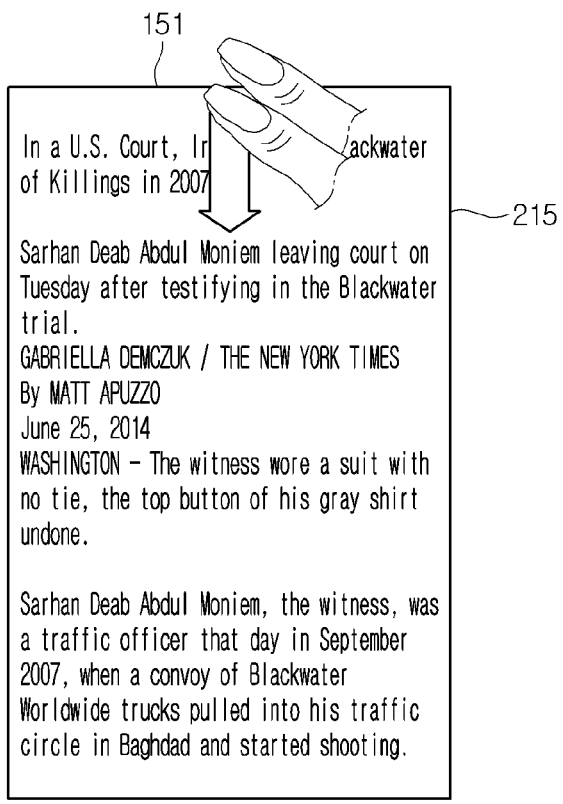
Figure 21B:
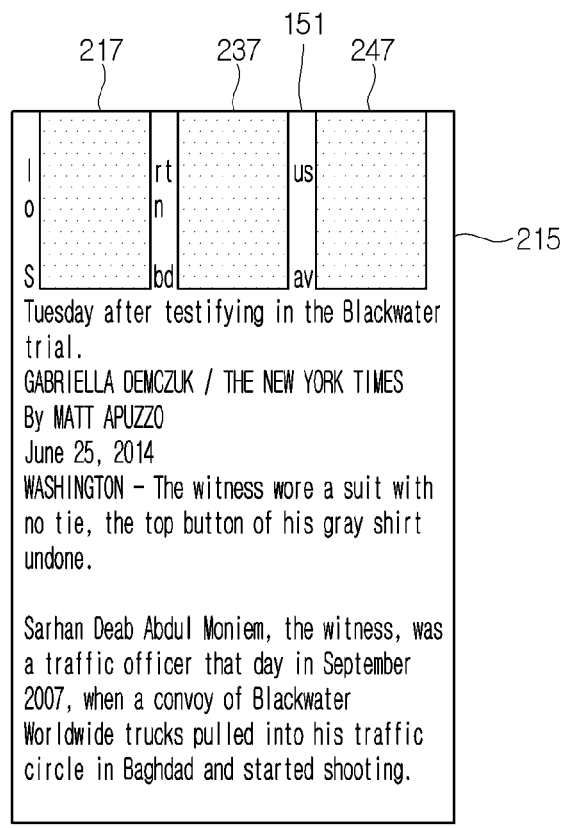

Referring to FIG. 21A, the control unit 180 may recognize a touch input, for example, swiping in the downward direction by two fingers from the upper end of a screen where content 215 corresponding to one content 210 among the multi-selected contents 210, 230, and 240 is displayed, as a user input for displaying a multi-selected contents list. Accordingly, as shown in FIG. 21B, in response to the touch input, the control unit 180 may cause the display unit 151 to display thumbnail images 217, 237, and 247 respectively corresponding to the multi-selected contents 210, 230, and 240, at the upper end of the screen end.

The above description for thumbnail image display for each of multi-selected contents may vary according to a user's or designer's selection.

Moreover, the control unit 180 may perform various operations for multi-selected contents on the basis of a user input received via a displayed thumbnail image. For example, the control unit 180 may perform at least displaying content corresponding to a displayed thumbnail image, cancelling selection of content, or editing the thumbnail images.

This will be described with reference to FIGS. 22A to 27B.

First, displaying content corresponding to a displayed thumbnail image will be described.

FIGS. 22A to 23B are views illustrating a selected content display according to an embodiment of the present invention.

Figure 22A:
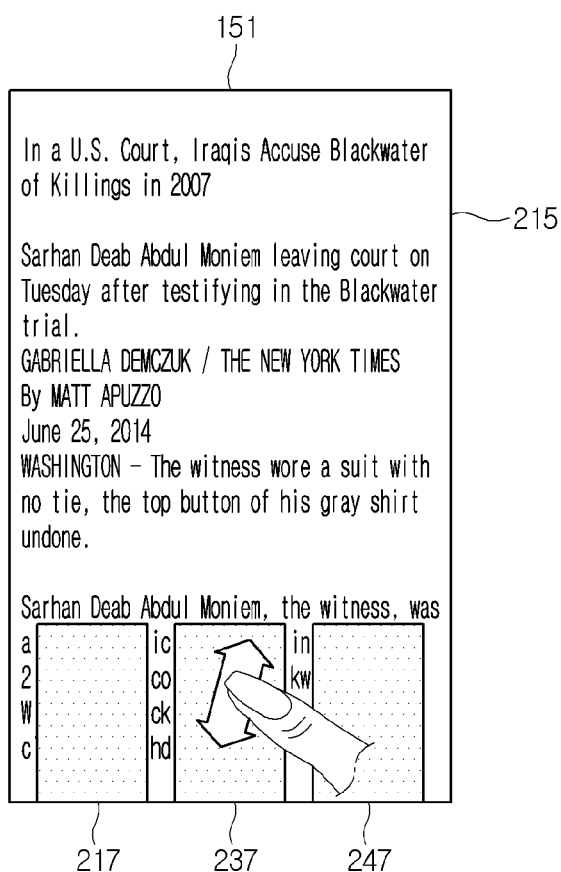

According to an embodiment of the present invention, referring to FIG. 22A, the control unit 180 may recognize a touch input, for example, double-tap touching one thumbnail image 237 among the thumbnail images 217, 237, and 247 for multi-selected contents, as a user input for displaying selected content. Accordingly, as shown in FIG. 22B, in response to the touch input, the control unit 180 may cause the display unit 151 to display content 235 corresponding to the selected thumbnail image 237. Accordingly, the control unit 180 may cause displaying of the selected content 235 on the display unit 151.

Figure 23A:
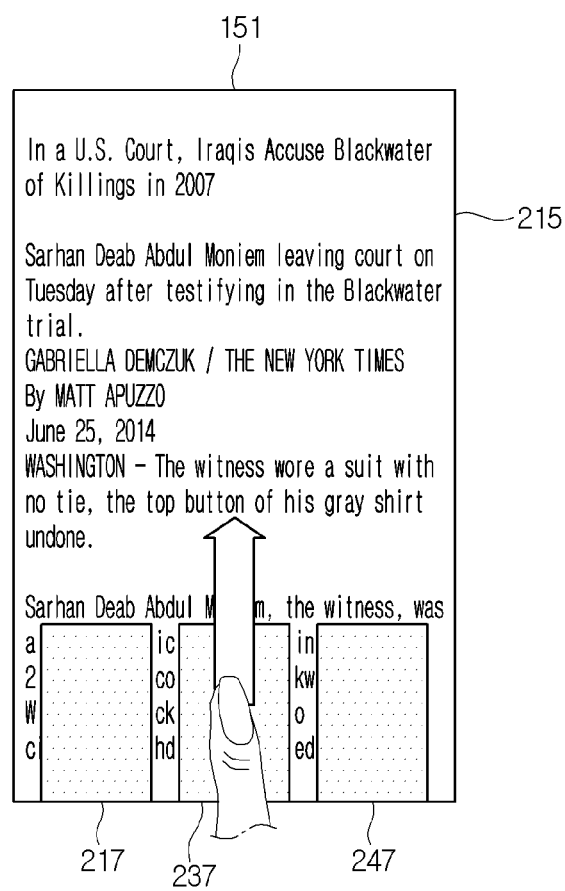

According to another embodiment of the present invention, referring to FIG. 23A, the control unit 180 may recognize a touch input, for example, swiping one thumbnail image 237 among the thumbnail images 217, 237, and 247 for the multi-selected contents toward an inner area of the screen, as a user input for displaying selected content. Accordingly, as shown in FIG. 23B, in response to the touch input, the control unit 180 may cause the display unit 151 to display content 235 corresponding to the selected thumbnail image 237. Accordingly, the control unit 180 may cause displaying of the selected content 235 on the display unit 151.

Deselecting a thumbnail image or cancelling selection of a thumbnail image will be described.

Figure 24A:
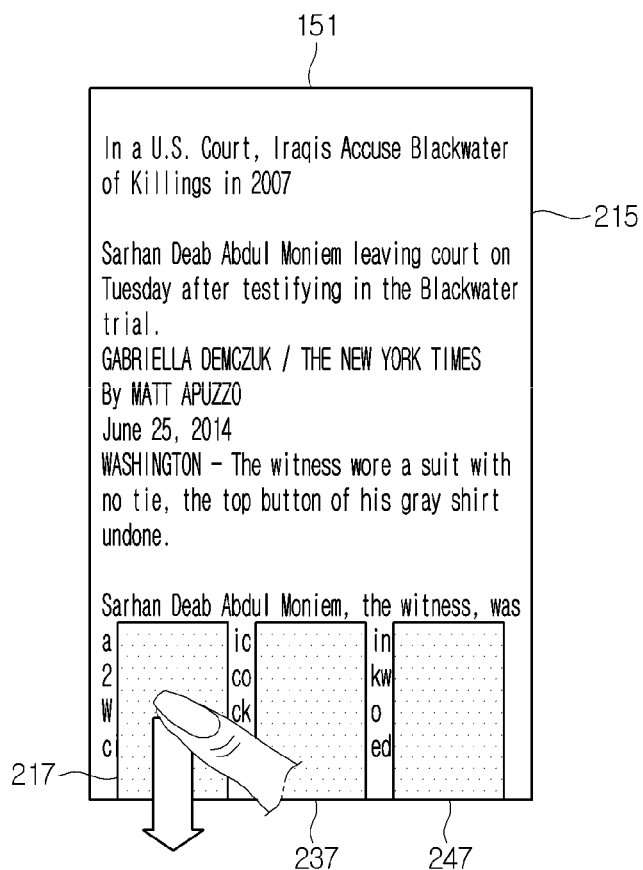

FIGS. 24A and 24B illustrate canceling selection of a thumbnail image according to an embodiment of the present invention.

Referring to FIG. 24A, the control unit 180 may recognize a touch input, for example, swiping one thumbnail image 217 among the thumbnail images 217, 237, and 247 for the multi-selected contents toward outside of the screen, as a user input for cancelling selected content. Accordingly, as shown in FIG. 24B, in response to the touch input, the control unit 180 may cancel selection of the content 215 corresponding to the selected thumbnail image 217. Accordingly, the control unit 180 may exclude the selected content 215 from the multiple selection.

Editing multi-selected contents via displayed thumbnail images will be described.

Figure 25A:
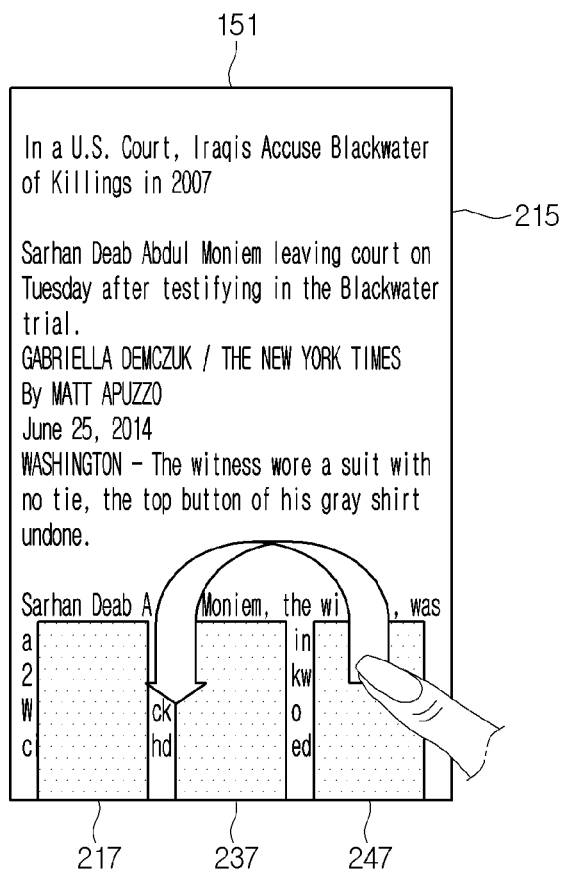
FIGS. 25A and 25B are views illustrating multi-selected contents editing according to an embodiment of the present invention.
Figure 25B:
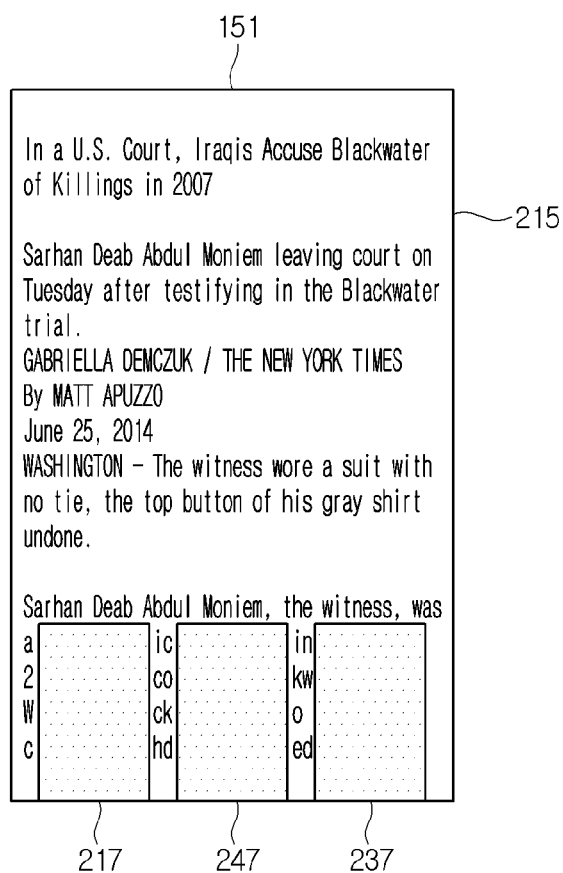

FIGS. 25A and 25B illustrate editing multi-selected contents according to an embodiment of the present invention.

Referring to FIG. 25A, the control unit 180 may recognize a touch input, for example, dragging and dropping one thumbnail image 247 among the respective thumbnail images 217, 237, and 247 for the multi-selected contents, as a user input for changing the order of the selected contents. Accordingly, as shown in FIG. 25B, in response to the touch input, the control unit 180 may change the order of the selected thumbnail images 217, 237, and 247 according to the position of the dropped thumbnail image 247. Accordingly, the control unit 180 may change the order of content 245 corresponding to the selected thumbnail image 247.

Additionally, the control unit 180 may cause displaying of a plurality of contents corresponding to a displayed thumbnail image at the same time.

This will be described with reference to FIGS. 26A to 27B.

FIGS. 26A to 27B are views illustrating displaying a plurality of contents according to an embodiment of the present invention.

Figure 26A:
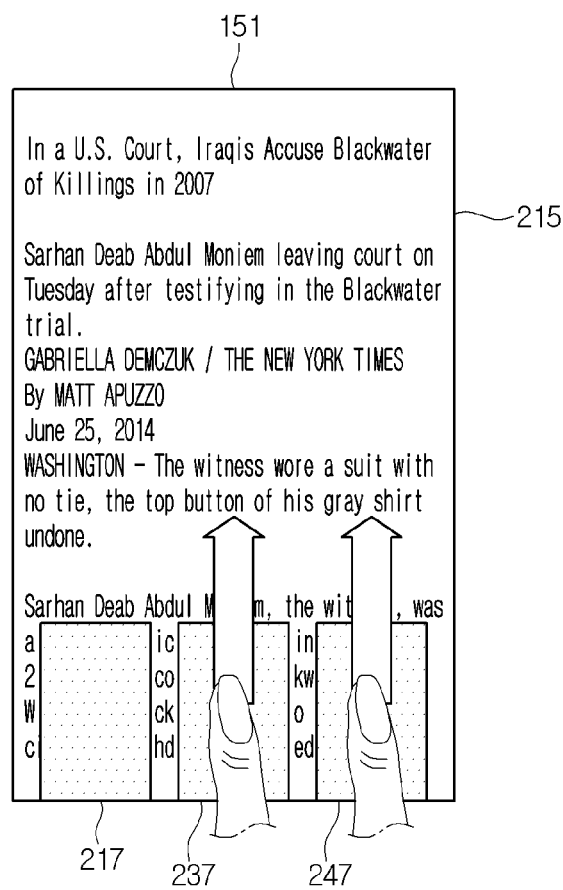

Referring to FIG. 26A, the control unit 180 may recognize a touch input, for example, swiping two thumbnail images 237 and 247 among the thumbnail images 217, 237, and 247 for the multi-selected contents toward an inner area of the screen, as a user input for displaying selected contents. Accordingly, as shown in FIG. 26B, in response to the touch input, the control unit 180 may cause the display unit 151 to display the contents 235 and 245 respectively corresponding to the selected thumbnail images 237 and 247. The control unit 180 may cause displaying of the selected contents 235 and 245 on the left side and the right side, respectively, of the screen.

Figure 27A:
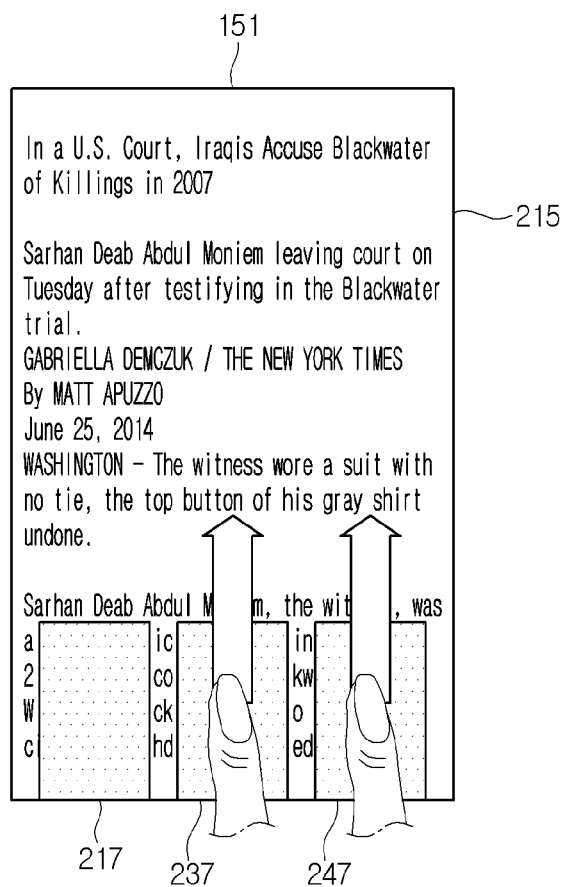
Figure 27B:
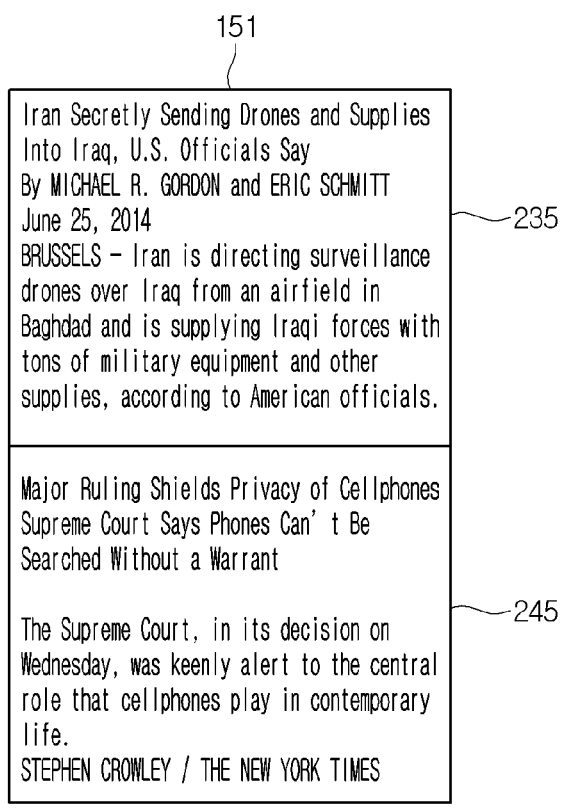

Referring to FIG. 27A, the control unit 180 may recognize a touch input, for example, swiping two thumbnail images 237 and 247 among the thumbnail images 217, 237, and 247 for the multi-selected contents toward an inner area of the screen, as a user input for displaying selected contents. Accordingly, as shown in FIG. 27B, in response to the touch input, the control unit 180 may cause the display unit 151 to display the contents 235 and 245 respectively corresponding to the selected two thumbnail images 237 and 247. The control unit 180 may cause displaying of the selected contents 235 and 245 on the top portion and the bottom portion, respectively, of the screen.

The above description for displaying a plurality of contents is exemplary, and thus, the number of contents to be displayed at the same time and a displayed screen may be set in various ways according to a user's or designer's selection.

Now, FIG. 3 will be referred. Referring to FIG. 3, when receiving a user input for copying a multi-selected contents full list in operation S113, the control unit 180 copies the multi-selected contents full list in operation S115.

The control unit 180 may receive a user input for copying the multi-selected contents full list. Herein, the user input may be one of a finger touch, a nail touch, a finger joint touch, and a multi touch. Then, when receiving a user input for copying a multi-selected contents full list, the control unit 180 may copy the multi-selected contents full list.

Herein, the copied multi-selected contents full list may include at least one of the title, summary, source, and link of each of the multi-selected contents.

This will be described with reference to FIGS. 28A to 29B. FIGS. 28A to 29B are views illustrating copying a multi-selected contents full list according to an embodiment of the present invention.

Figure 28A:
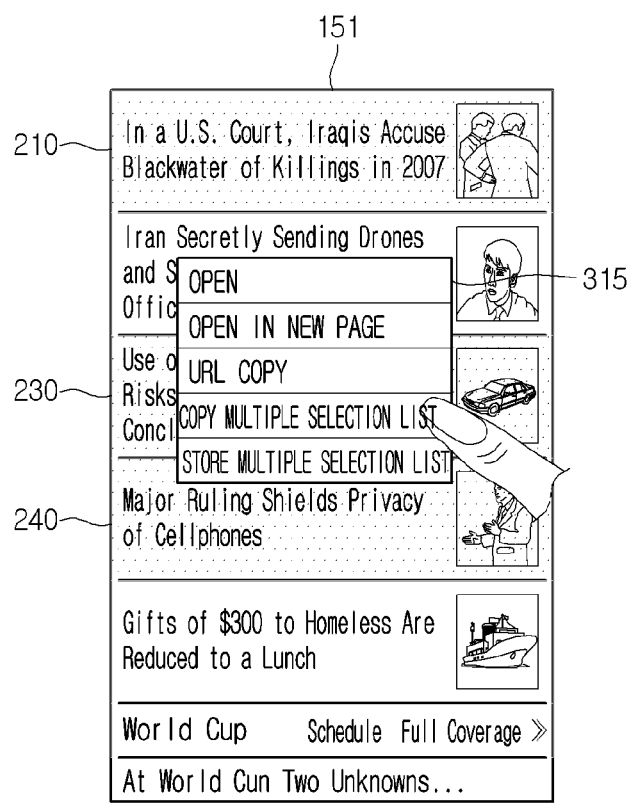
FIGS. 28A, 28B, 29A, and 29B are views illustrating a multi-selected contents full list copy according to an embodiment of the present invention.
Figure 28B:
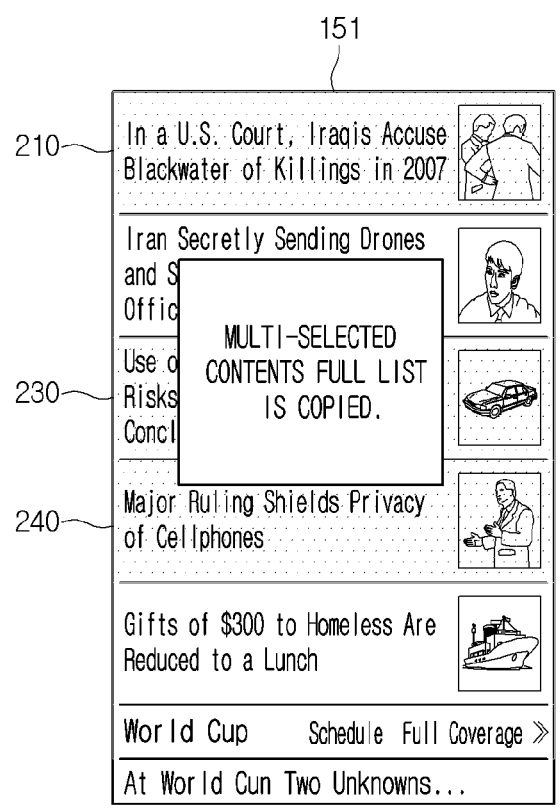

According to another embodiment of the present invention, referring to FIG. 28A, the control unit 180 may recognize a user input for selecting a multi-selected contents copy from a pop-up menu 315 for multi-selected contents 210, 230, and 240. Accordingly, as shown in FIG. 28B, in response to the touch input, the control unit 180 may copy a multi-selected contents full list including at least one of a title, a summary, a source, and a link for each of the multi-selected contents 210, 230, and 240.

Figure 29A:
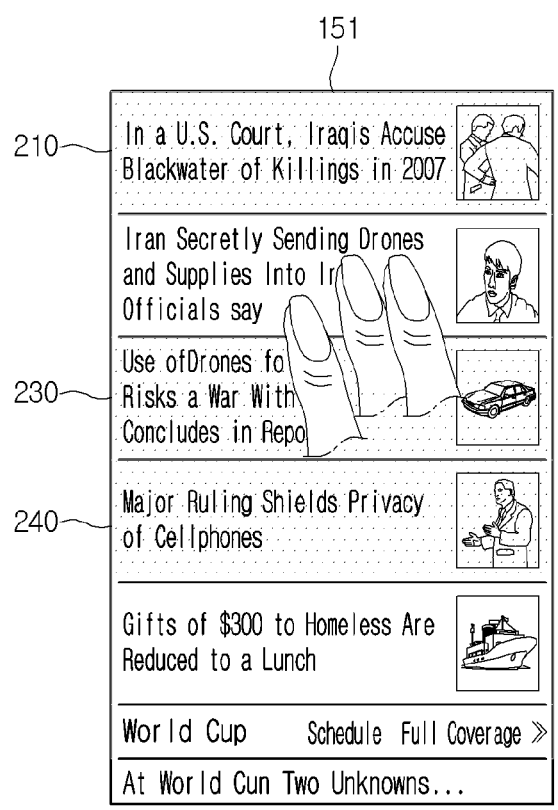
Figure 29B:
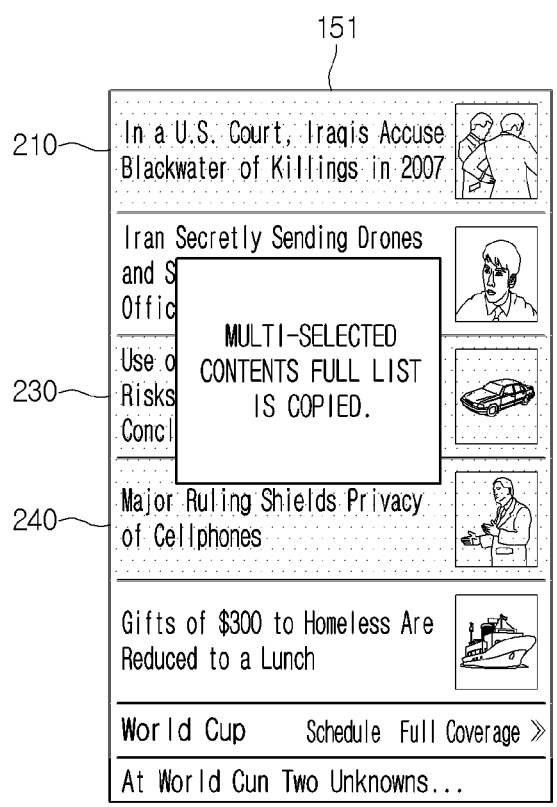

According to another embodiment of the present invention, referring to FIG. 29A, the control unit 180 may recognize a touch input, for example, tap touching by three fingers, as a user input for a multi-selected contents full list copy. Accordingly, as shown in FIG. 29B, in response to the touch input, the control unit 180 may copy a multi-selected contents full list including at least one of a title, a summary, a source, and a link for each of the multi-selected contents 210, 230, and 240.

The above description for multi-selected contents full list copy may vary according to a user's or designer's selection.

Referring back to FIG. 3, when receiving a user input for transmitting a multi-selected contents full list in operation S117, the control unit 180 causes transmission of the multi-selected contents full list in operation S119.

The control unit 180 may recognize a user input for transmitting the multi-selected contents full list. Herein, a user input for transmitting a multi-selected contents full list may be one of a finger touch, a nail touch, a finger joint touch, and a multi touch. Then, when receiving a user input for transmitting a multi-selected contents full list, the control unit 180 may cause transmission of the multi-selected contents full list to another device. Then, the other device may use the received multi-selected contents full list.

Figure 30A:
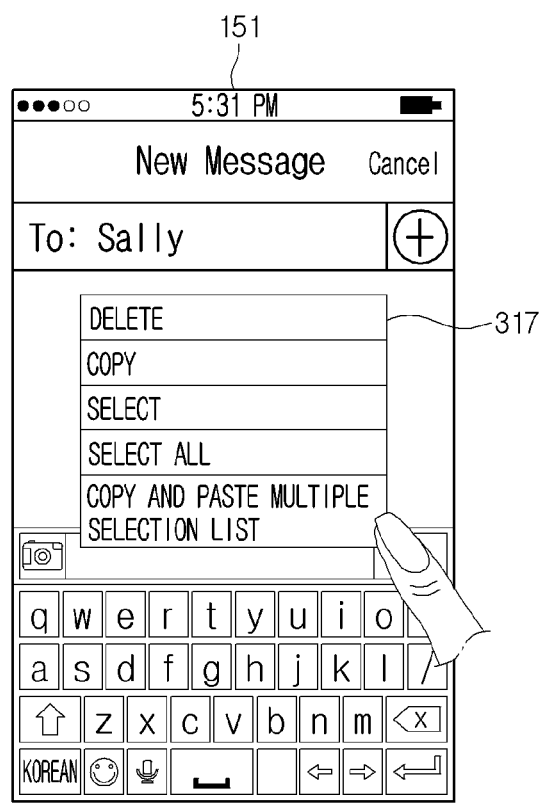
FIGS. 30A and 30B are views illustrating a multi-selected contents full list transmission according to an embodiment of the present invention.
Figure 30B:
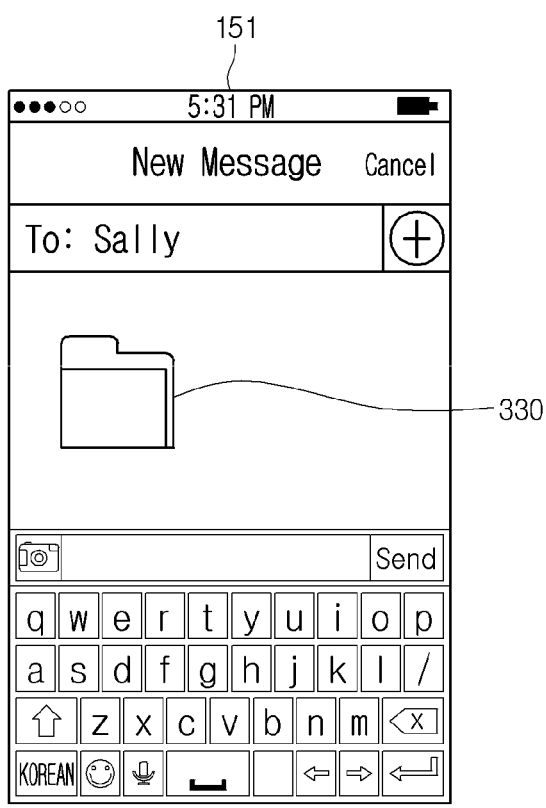
Figure 31:
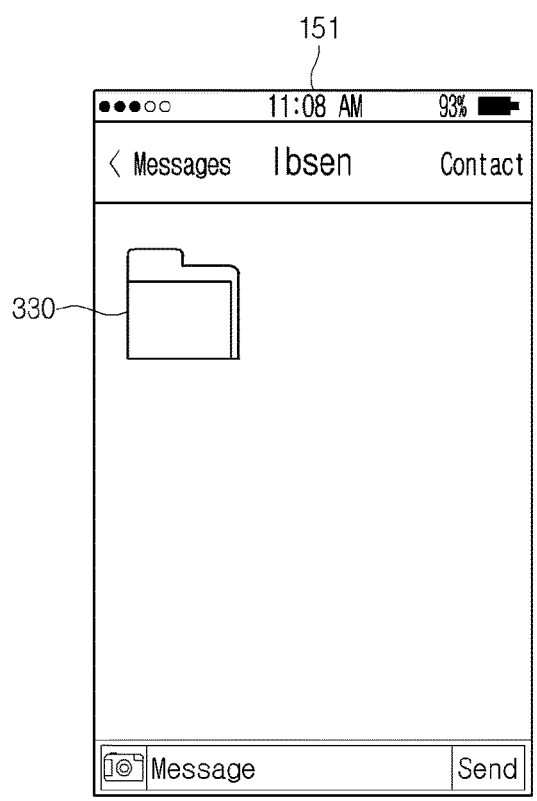
FIG. 31 is a view illustrating a multi-selected contents full list reception according to an embodiment of the present invention.

This will be described with reference to FIGS. 30A to 33B. FIGS. 30A and 30B illustrate transmission of a multi-selected contents full list according to an embodiment of the present invention. FIG. 31 is a view illustrating a multi-selected contents full list reception according to an embodiment of the present invention. FIGS. 32A to 33B are views illustrating a multi-selected contents full list display according to an embodiment of the present invention.

According to an embodiment of the present invention, referring to FIG. 30A, the control unit 180 may recognize a user input for pasting a multi-selected contents full list from a pop-up menu 317 for multi-selected contents 210, 230, and 240. Accordingly, as shown in FIG. 30B, in response to the user input for selecting a multi-selected contents full list copy and paste from the pop-up menu 317, the control unit 180 may include in message a multi-selected contents full list including at least one of a title, a summary, a source, and a link for each of the multi-selected contents 210, 230, and 240. Then, as shown in FIG. 31, the control unit 180 may include a multiple selection icon 330 representing a multi-selected contents full list in a message including the multi-selected contents full list.

Then, when receiving a message including a multi-selected contents full list, another terminal 100 may display the multi-selected contents list in the message.

Figure 32A:
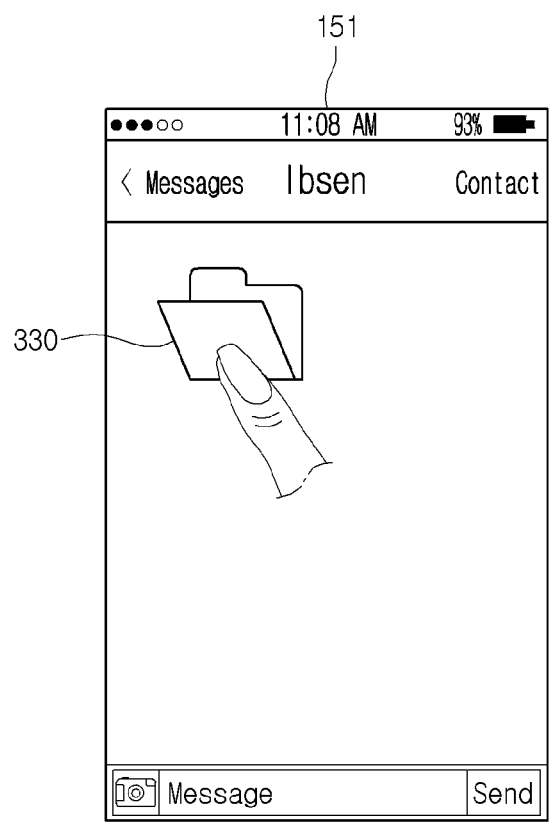
FIGS. 32A, 32B, 33A, and 33B are views illustrating a received multi-selected contents full list display according to an embodiment of the present invention.
Figure 32B:
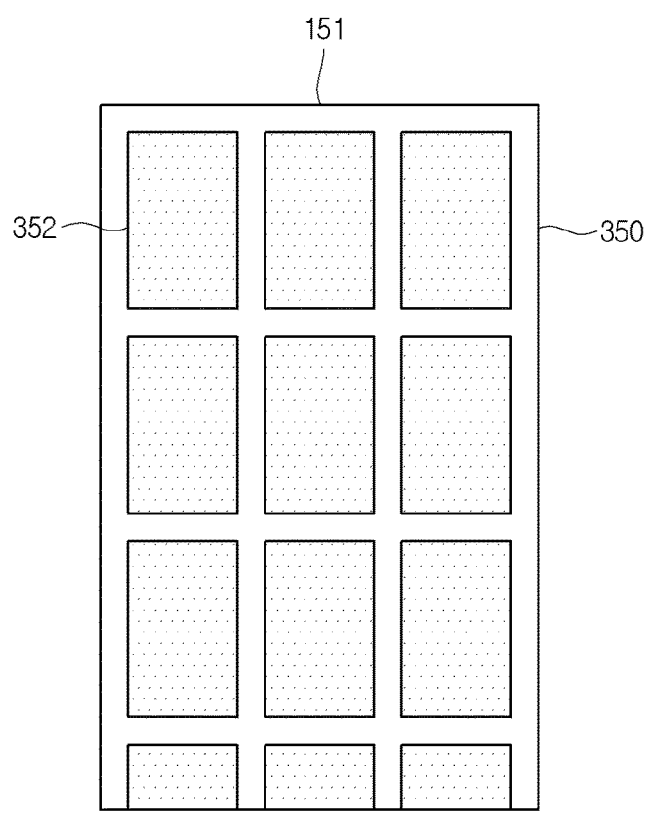

According to an embodiment of the present invention, referring to FIG. 32A, the control unit 180 may recognize a touch input, for example, tap touching a multi-selected icon 330 included in the received message, as a user input for displaying a multi-selected contents list. Accordingly, as shown in FIG. 32B, in response to the touch input, the control unit 180 may cause the display unit 151 to display the multi-selected contents list 350. The multi-selected contents list 350 may include a thumbnail image 352 for each of the multi-selected contents. Then, when receiving a user input for selecting one content from the displayed multi-selected contents list, the control unit 180 may cause displaying of the selected content on the display unit 151.

Figure 33A:
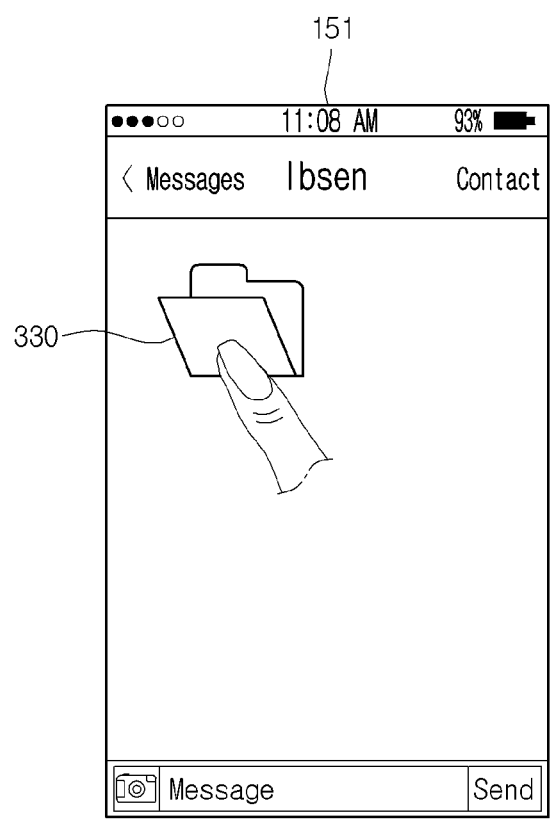
Figure 33B:
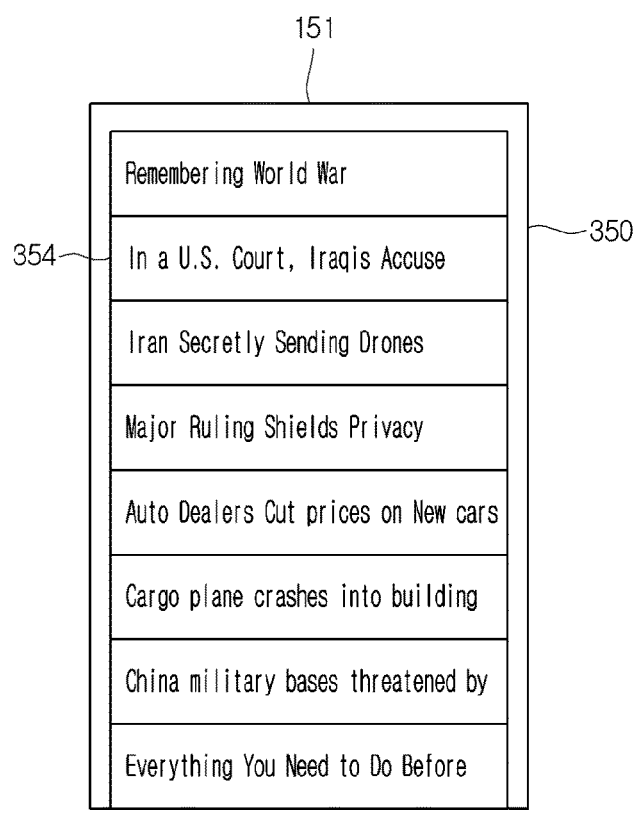

According to another embodiment of the present invention, referring to FIG. 33A, the control unit 180 may recognize a touch input, for example, tap touching a multi-selected icon 330 included in the received message, as a user input for displaying a multi-selected contents list. Accordingly, as shown in FIG. 33B, in response to the touch input, the control unit 180 may cause the display unit 151 to display the multi-selected contents list 350. The multi-selected contents list 350 may include content 354 for each of the multi-selected contents. Herein, the content 354 for each of the multi-selected contents may include at least one of the title, summary, source, and link of content. Then, when receiving a user input for selecting one content from the displayed multi-selected contents list, the control unit 180 may cause displaying of the selected content on the display unit 151.

Then, the control unit 180 may perform various operations for multi-selected contents on the basis of a user input for a displayed multi-selected contents list and this is described above.

Referring back to FIG. 3, when receiving a user input for storing a multi-selected contents full list in operation S121, the control unit 180 causes storing of the multi-selected contents full list in operation S123.

The control unit 180 may recognize a user input for storing the multi-selected contents full list. Herein, a user input for storing a multi-selected contents full list may be one of a finger touch, a nail touch, a finger joint touch, and a multi touch. Then, when receiving a user input for storing a multi-selected contents full list, the control unit 180 may cause storing of the multi-selected contents full list.

This will be described with reference to FIGS. 34A to 35B. FIGS. 34A to 35B illustrate storing a multi-selected contents full list according to an embodiment of the present invention.

Figure 34A:
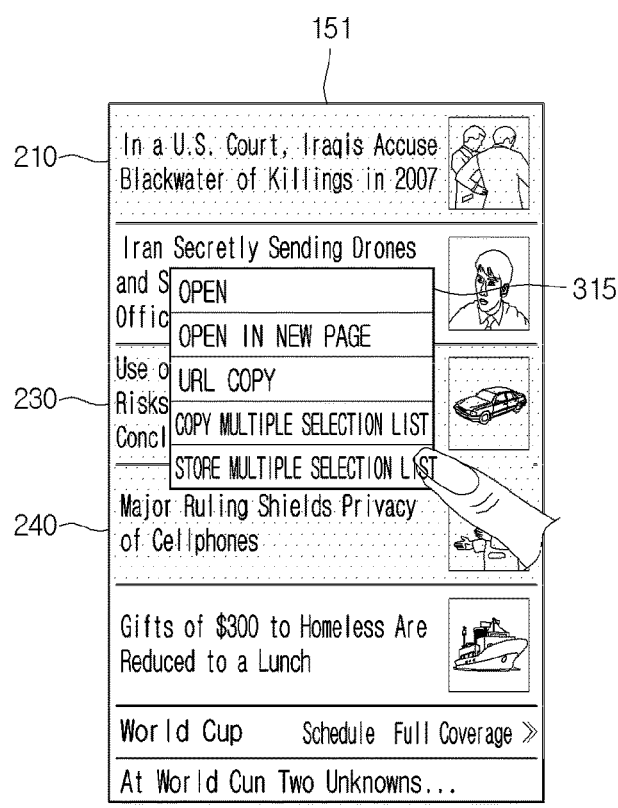
FIGS. 34A, 34B, 35A, and 35B are views illustrating multi-selected contents full list storage according to an embodiment of the present invention.
Figure 34B:
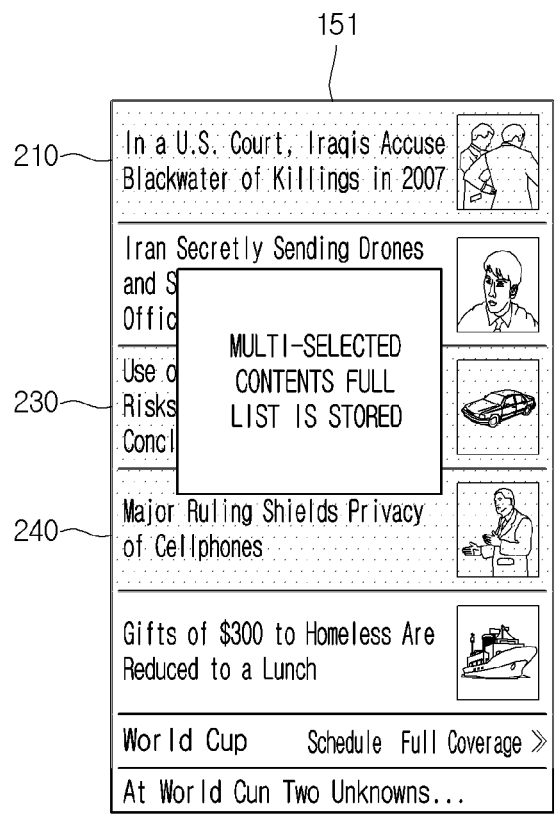

According to an embodiment of the present invention, referring to FIG. 34A, the control unit 180 may recognize a user input for selecting a multi-selected contents full list storage from a pop-up menu 315 for multi-selected contents 210, 230, and 240. Accordingly, as shown in FIG. 34B, in response to the input, the control unit 180 may cause storing of a multi-selected contents full list including at least one of a title, a summary, a source, and a link for each of the multi-selected contents 210, 230, and 240.

Figure 35A:
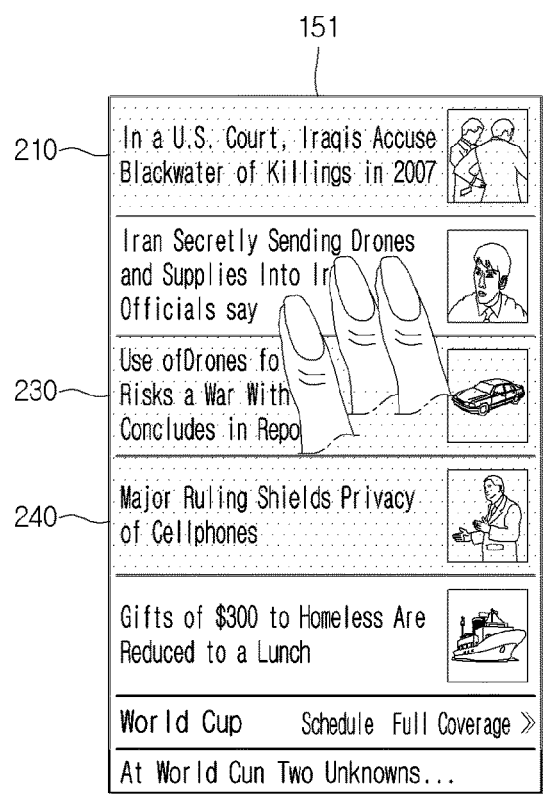
Figure 35B:
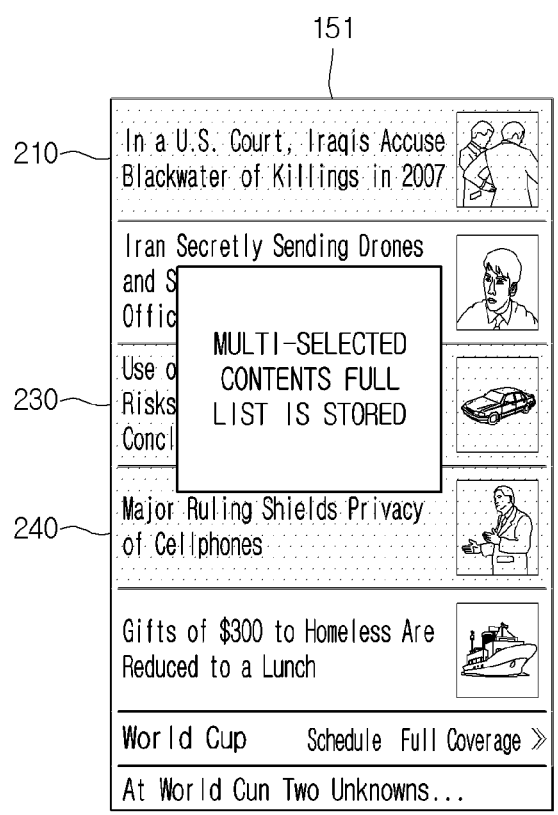

According to another embodiment of the present invention, referring to FIG. 35A, the control unit 180 may recognize a touch input, for example, tap touching by four fingers, as a user input for storing a multi-selected contents full list. Accordingly, as shown in FIG. 35B, in response to the touch input, the control unit 180 may cause storing of a multi-selected contents full list including at least one of a title, a summary, a source, and a link for each of the multi-selected contents 210, 230, and 240.

Moreover, when storing a multi-selected contents full list, the control unit 180 may include and cause storing of information on the stored multi-selected contents full list. Herein, the information on the multi-selected contents full list may include at least one of a subject, a title, and a storage time.

The above description for multi-selected contents full list storage may vary according to a user's or designer's selection.

Moreover, the terminal 100 may multi-select contents displayed on a plurality of pages. Hereinafter, an operation for multi-selecting contents displayed on a plurality of pages of the terminal 100 will be described with reference to FIGS. 36 to 42B.

Figure 36:
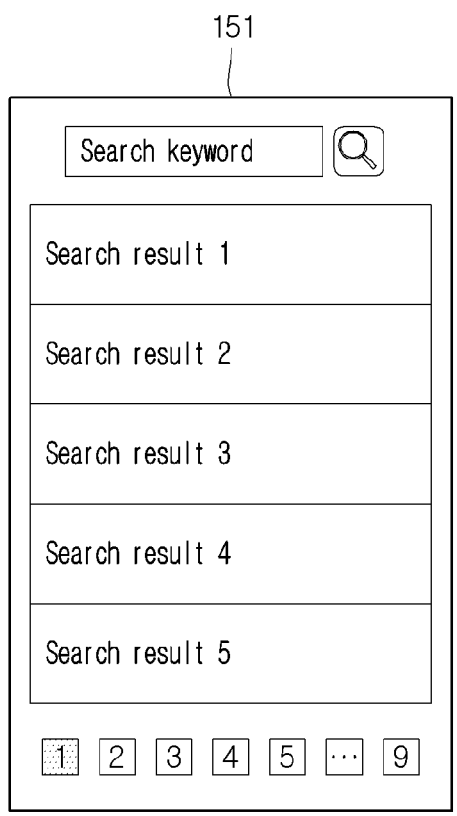
FIG. 36 is a view illustrating contents displayed on a plurality of pages according to an embodiment of the present invention.

FIG. 36 is a view illustrating contents displayed on a plurality of pages according to an embodiment of the present invention. FIGS. 37 to 41B are views illustrating selecting multiple contents according to an embodiment of the present invention.

Referring to FIG. 36, the control unit 280 may cause the display unit 151 to display a search result for a search word on a plurality of pages and each of the plurality of pages may include contents for a plurality of search results.

Figure 37:
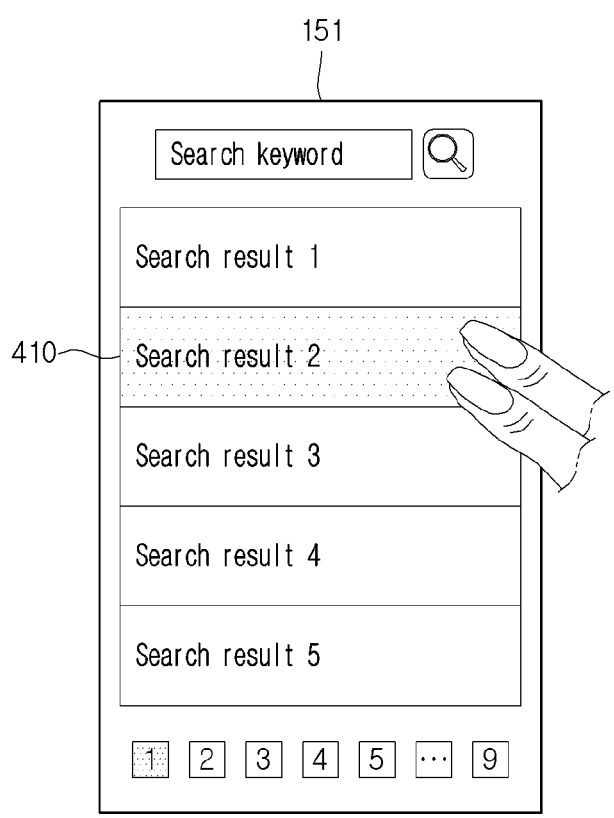
FIGS. 37 to 40, 41A, and 41B are views illustrating contents multiple selection according to an embodiment of the present invention.
Figure 38:
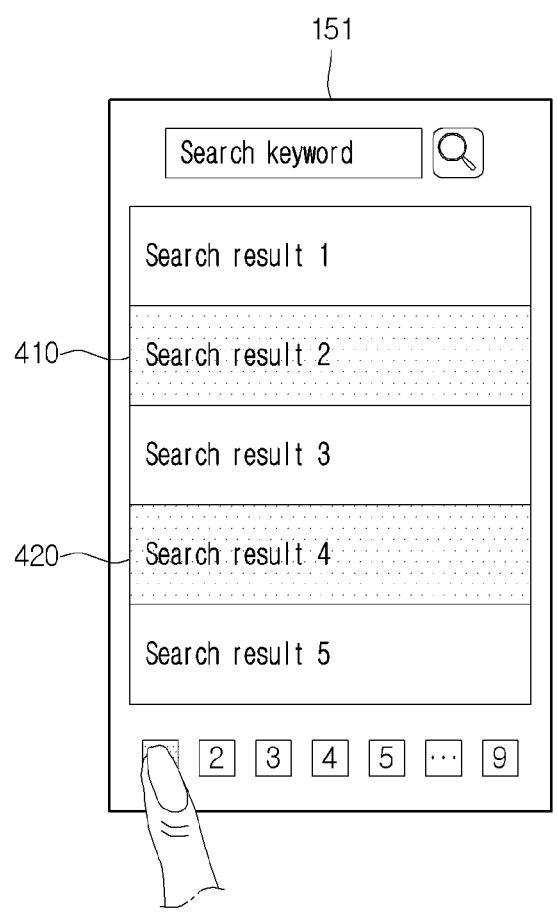

Referring to FIG. 37, the control unit 180 may recognize a multi touch for selecting content by two fingers from a displayed search result as a user input for multiple selection. Accordingly, the control unit 180 may recognize that the selected content 410 is one of multi-selected contents. Herein, as an example for describing a multi touch using two fingers, the number of fingers of a multi touch for multiple selection may be set differently according to a user's or designer's selection.

The control unit 180 may multi-select a plurality of contents from one page among a plurality of pages for a search result and may cause the display unit 151 to display another page for the search result.

This will be described with reference to FIGS. 38 to 41B. According to an embodiment of the present invention, referring to FIG. 38, the control unit 180 may multi-select a plurality of contents 410 and 420 from the first page. Then, the control unit 180 may recognize a touch input, for example, long touching a page number, as a user input for storing the contents 410 and 420 multi-selected from the first page. Accordingly, in response to the touch input, the control unit 180 may cause storing of the multi-selected contents 410 and 420. Then, the control unit 180 may recognize a user input for multi-selecting a plurality of contents included in another page by displaying the other page, instead of the first page.

Figure 39:
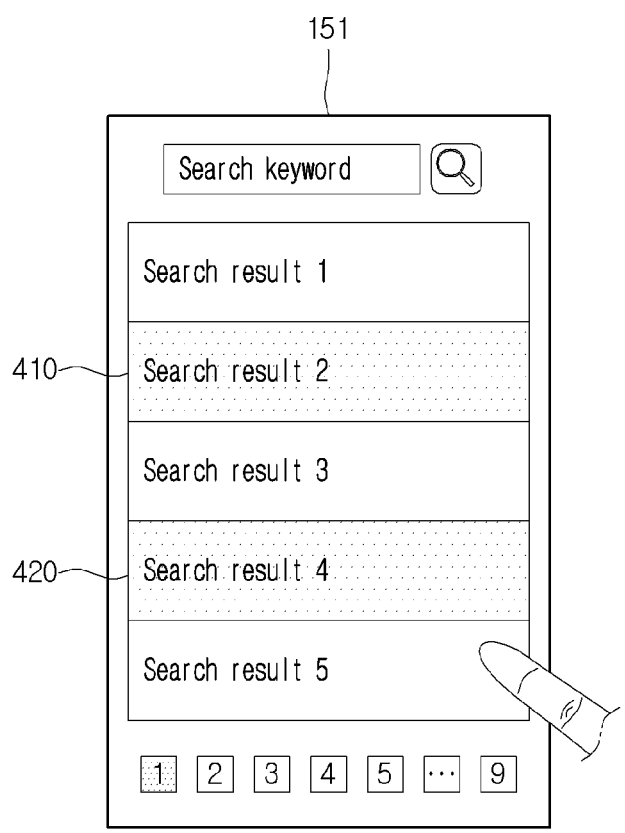

According to another embodiment of the present invention, referring to FIG. 39, the control unit 180 may multi-select a plurality of contents 410 and 420 from the first page. Then, the control unit 180 may recognize a touch input, for example, touching a screen by a nail, as a user input for storing the contents 410 and 420 multi-selected from the first page. Accordingly, in response to the touch input, the control unit 180 may cause storing of the multi-selected contents 410 and 420. Then, the control unit 180 may recognize a user input for multi-selecting a plurality of contents included in another page by displaying the other page, instead of the first page.

Figure 40:
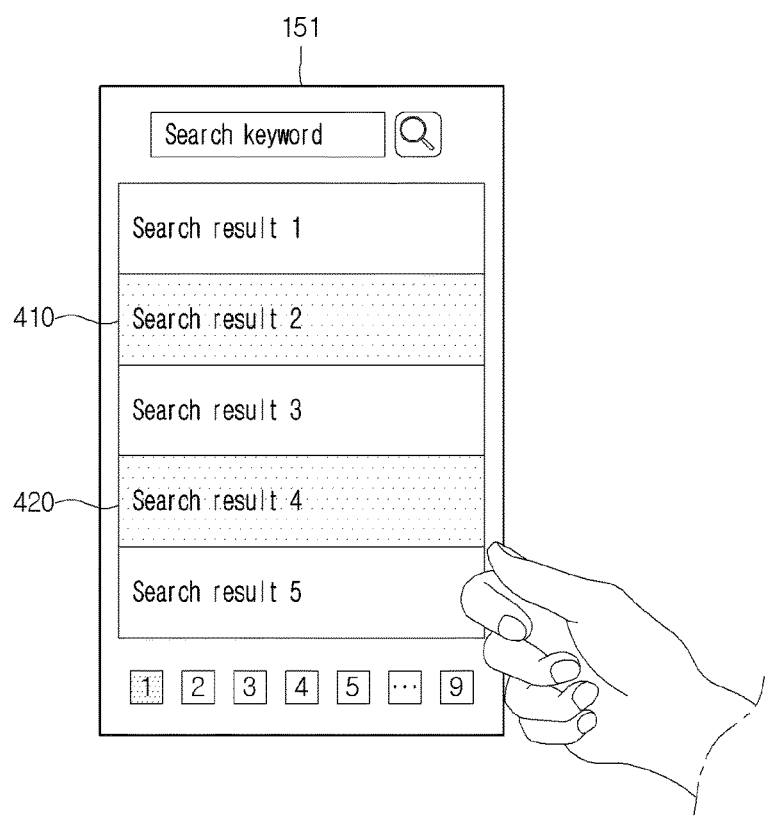

According to another embodiment of the present invention, referring to FIG. 40, the control unit 180 may multi-select a plurality of contents 410 and 420 from the first page. Then, the control unit 180 may recognize a touch input, for example, touching a screen by a finger joint, as a user input for storing the contents 410 and 420 multi-selected from the first page. Accordingly, in response to the touch input, the control unit 180 may cause storing of the multi-selected contents 410 and 420. Then, the control unit 180 may recognize a user input for multi-selecting a plurality of contents included in another page by displaying the other page, instead of the first page.

Figure 41A:
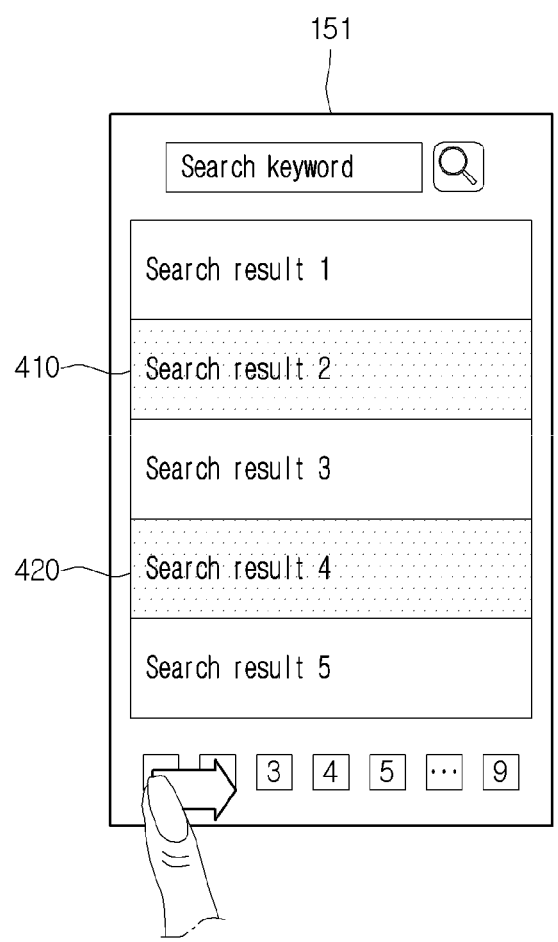
Figure 41B:
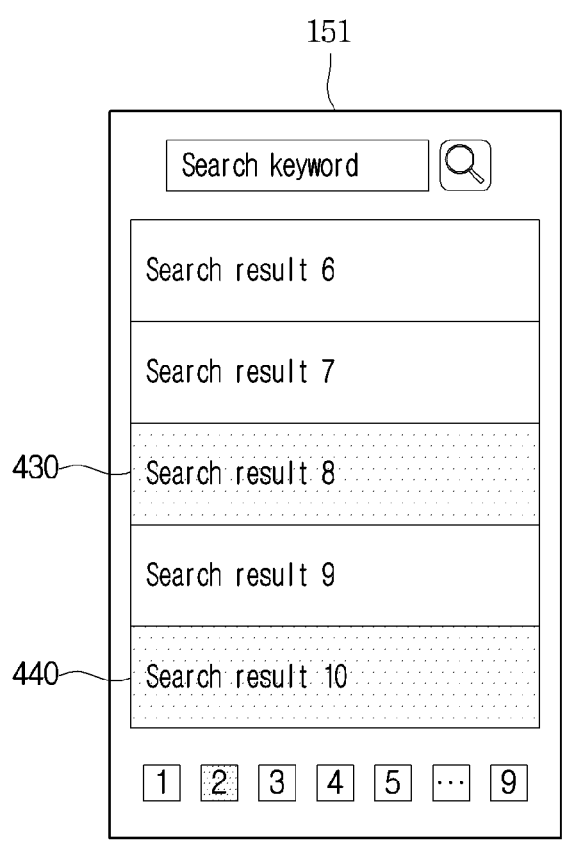

According to another embodiment of the present invention, referring to FIG. 41A, the control unit 180 may multi-select a plurality of contents 410 and 420 from the first page. Then, the control unit 180 may recognize a touch input, for example, swiping a page number, as a user input for storing the contents 410 and 420 multi-selected from the first page and displaying another page. Accordingly, in response to the touch input, the control unit 180 may cause storing of the multi-selected contents 410 and 420 and may then cause displaying of the next page. As shown in FIG. 41B, the control unit 180 may cause the display unit 151 to display the second page, i.e., the next page, and may then recognize a user input for multi-selecting a plurality of contents included in the second page.

Moreover, the control unit 180 may cause the display unit 151 to display one content of multi-selected contents on one page among a plurality of pages on the basis of a user input. Herein, a displayed content may be content selected first or content displayed on the top among multi-selected contents in one page.

Figure 42A:
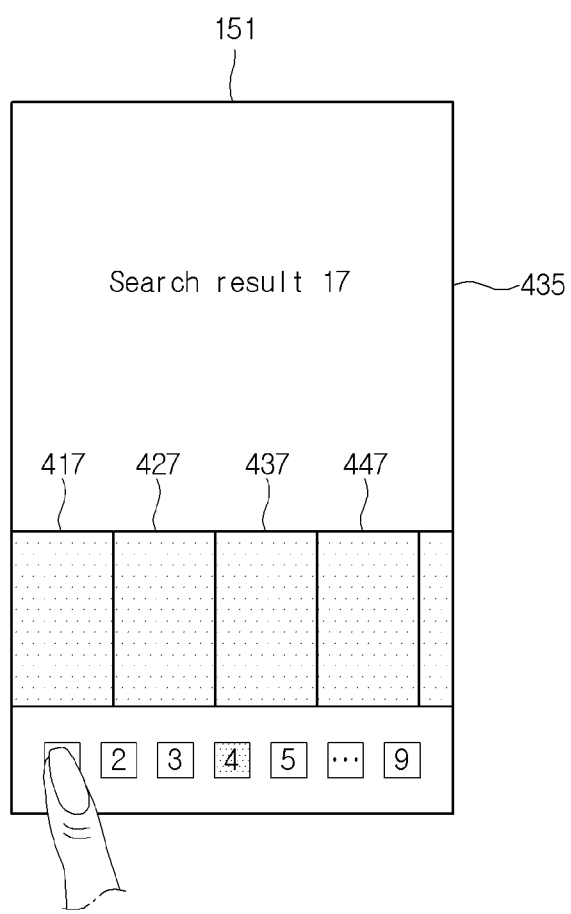
FIGS. 42A and 42B are views illustrating multi-selected contents display according to another embodiment of the present invention.
Figure 42B:
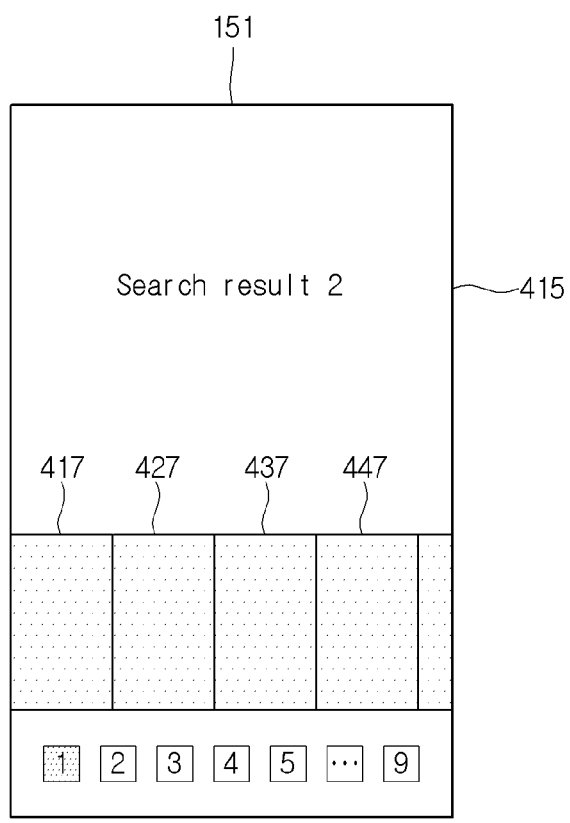

This will be described with reference to FIGS. 42A and 42B. FIGS. 42A and 42B illustrate displaying multi-selected contents according to another embodiment of the present invention.

Referring to FIG. 42A, the control unit 180 may cause the display unit 151 to display content 435 corresponding to one content 430 among multi-selected contents 410, 420, 430, and 440. Then, the control unit 180 may cause the display unit 151 to display respective thumbnail images 417, 427, 437, and 447 for the multi-selected contents 410, 420, 430, and 440, respectively. The control unit 180 may recognize a touch input, for example, long touching the first page number, as a user input for displaying one content among contents multi-selected from the first page among a plurality of pages. As shown in FIG. 42B, in response to the touch input, the control unit 180 may cause the display unit 151 to display content 415 corresponding to one content 410 among contents multi-selected from the first page.

Furthermore, when selecting multi-select a plurality of contents displayed on a plurality of pages, the control unit 180 may perform the content entry and switching, multi-selected contents list display, multi-selected contents full list copy, transmission, and storage operations. This is described above, and thus, detailed descriptions are omitted.

In such a way, the terminal 100 may multi-select a plurality of contents and may allow a user to view and manage the selected content easily.

Additionally, the present invention uses a manipulation method that does not overlap with a known typical contents manipulation method, and thus, provides an easy contents manipulation method to a user.

In relation to a terminal and its operating method according to an embodiment of the present invention, a user may select a plurality of contents and may then use the plurality of selected contents easily.

Additionally, according to an embodiment of the present invention, a user may store and share information on a plurality of contents easily.

Additionally, the present invention may provide an intuitive manipulation method to a user without overlapping with a known typical contents manipulation method.

According to an embodiment of the present invention, the above method may be implemented on a program recorded medium as processor readable code. Examples of the processor readable medium may include ROM, RAM, CD-ROM, magnetic tape, floppy disk, and optical data storage devices and also may be implemented in a form of a carrier wave (for example, transmission through internet).

In relation to the above-described terminal, the configurations and methods of the above-described embodiments are applied without limitations and in order to provide various modifications, some or all of embodiments may be selectively combined and configured.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a terminal, the method comprising:
    displaying a plurality of page numbers on a display of the terminal;
    displaying a predetermined number of items included in a contents list with the plurality of page numbers, the contents list comprising a plurality of items and each of the plurality of items corresponding to one of the plurality of page numbers;
    selecting at least two items of the contents list from a first set of items displayed on a first page corresponding to a first page number among the plurality of page numbers in response to receiving of a first input;
    displaying the selected at least two items distinguishably from the rest of the first set of items that is displayed on the first page and not selected in response to the first input;
    storing contents corresponding to the selected at least two items of the first page in a memory and displaying a second page corresponding to a second page number among the plurality of page numbers in response to receiving of a second input for swiping the first page number, the second input received while the selected at least two items are distinguishably displayed on the first page;
    storing additional contents corresponding to at least two items of the contents list selected from a second set of items displayed on the second page;
    displaying a first content among the stored contents and a plurality of first thumbnail images in response to receiving of a third input for selecting the first page number such that the first content, the plurality of first thumbnail images, and the plurality of page numbers are displayed simultaneously,
    wherein the first content corresponds to a first item of the at least two items selected from the contents list while being displayed on the first page, and each of the plurality of first thumbnail images corresponds to a respective one of the at least two items selected from the contents list while being displayed on the first page; and
    displaying a second content among the stored contents in response to receiving of a fourth input for selecting a second page number from among the plurality of page numbers such that the second content, the plurality of second thumbnail images, and the plurality of page numbers are displayed simultaneously, the fourth input received while the first content is displayed,
    wherein the second content corresponds to a second item of the at least two items selected from the contents list while being displayed on the second page, and each of the plurality of second thumbnail images corresponds to a respective one of the at least two items selected from the contents list while being displayed on the second page.

2. The method according to claim 1, further comprising: displaying a third content among the stored contents instead of the first content in response to receiving of a fifth input while the first content is displayed, the third content corresponding to a third item among the at least two items selected from the contents list while being displayed on the first page.

3. The method according to claim 2, further comprising: re-displaying the first content in response to receiving of a sixth input while the third content is displayed.

4. The method according to claim 3, wherein the fifth input comprises swiping the first content in a first direction and the sixth input comprises swiping the third content in a second direction that is an opposite direction of the first direction.

5. The method according to claim 3, wherein:
each of the at least two items is selected one by one in order from the plurality of items;
each content corresponding to the selected at least two items is displayed one by one according to the order; and
the first item is selected prior to the selection of the third item such that the first content is displayed prior to the displaying of the third content.

6. The method according to claim 1, further comprising: rearranging an order of the selected at least two items in response to a fifth input for rearranging an order of the plurality of first or second thumbnail images, the rearranged order of the plurality of first or second thumbnail images corresponding to the rearranged order of the selected at least two items; or
de-selecting one of the selected at least two items in response to a sixth input for deleting a corresponding one of the plurality of first or second thumbnail images.

7. The method according to claim 1, further comprising: transmitting a list of the selected at least two items or a list of the contents corresponding to the selected at least two items to an external device in response to receiving of a fifth input.

8. The method according to claim 7, wherein the transmitted list of the plurality of selected items or list of the contents comprises at least a title, a summary, a source, or a link for each of the plurality of selected at least two items or the contents corresponding to the selected at least two items.

9. The method according to claim 1, wherein the stored contents comprise at least a title, a summary, a source, or a link for each of the plurality of selected at least two items or the contents corresponding to the selected at least two items.

10. The method according to claim 1, wherein the first input comprises at least a nail touch input, a finger joint touch input, or a multi touch input generated by a plurality of fingers.

11. A terminal comprising:
a display;
a memory; and
a controller operably coupled with the display and configured to:
cause the display to display a plurality of page numbers;
cause the display to display a predetermined number of items included in a contents list with the plurality of page numbers, the contents list comprising a plurality of items and each of the plurality of items corresponding to one of the plurality of page numbers;
select at least two items of the contents list from a first set of items displayed on a first page corresponding to a first page number among the plurality of page numbers in response to receiving of a first input;
cause the display to display the selected at least two items distinguishably from the rest of the first set of items that is displayed on the first page and not selected in response to the first input;
cause the memory to store contents corresponding to the selected at least two items of the first page and cause the display to display a second page corresponding to a second page number among the plurality of page numbers in response to receiving of a second input for swiping the first page number, the second input received while the selected at least two items are distinguishably displayed on the first page;
cause the memory to store additional contents corresponding to at least two items of the contents list selected from a second set of items displayed on the second page;
cause the display to display a first content among the stored contents and a plurality of first thumbnail images in response to receiving of a third input for selecting the first page number such that the first content, the plurality of first thumbnail images, and the plurality of page numbers are displayed simultaneously,
wherein the first content corresponds to a first item of the at least two items selected from the contents list while being displayed on the first page, and each of the plurality of first thumbnail images corresponds to a respective one of the at least two items selected from the contents list while being displayed on the first page; and
cause the display to display a second content among the stored contents in response to receiving of a fourth input for selecting a second page number from among the plurality of page numbers such that the second content, the plurality of second thumbnail images, and the plurality of page numbers are displayed simultaneously, the fourth input received while the first content is displayed,
wherein the second content corresponds to a second item of the at least two items selected from the contents list while being displayed on the second page, and each of the plurality of second thumbnail images corresponds to a respective one of the at least two items selected from the contents list while being displayed on the second page.

12. The terminal according to claim 11, wherein the controller is further configured to:
cause the display to display a third content among the stored contents instead of the first content in response to receiving of a fifth input received while the first content is displayed, the third content corresponding to a third item among the at least two items selected from the contents list while being displayed on the first page.

* * * * *